(12) United States Patent
Tsuboi et al.

(10) Patent No.: US 9,961,693 B2
(45) Date of Patent: May 1, 2018

(54) TERMINAL APPARATUS, BASE STATION APPARATUS, COMMUNICATION SYSTEM, NOTIFICATION METHOD, AND INTEGRATED CIRCUIT

(71) Applicant: SHARP KABUSHIKI KAISHA, Sakai, Osaka (JP)

(72) Inventors: Hidekazu Tsuboi, Sakai (JP); Katsunari Uemura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days. days.

(21) Appl. No.: 15/121,331

(22) PCT Filed: Mar. 20, 2015

(86) PCT No.: PCT/JP2015/058434
§ 371 (c)(1),
(2) Date: Aug. 24, 2016

(87) PCT Pub. No.: WO2015/141824
PCT Pub. Date: Sep. 24, 2015

(65) Prior Publication Data
US 2017/0013634 A1  Jan. 12, 2017

(30) Foreign Application Priority Data

Mar. 20, 2014 (JP) ................................ 2014-057363

(51) Int. Cl.
*H04W 72/10* (2009.01)
*H04W 76/02* (2009.01)
(Continued)

(52) U.S. Cl.
CPC ....... *H04W 72/10* (2013.01); *H04W 28/0278* (2013.01); *H04W 72/0413* (2013.01);
(Continued)

(58) Field of Classification Search
CPC ............ H04W 72/10; H04W 28/0278; H04W 72/0413; H04W 72/1215; H04W 76/023
See application file for complete search history.

(56) References Cited

U.S. PATENT DOCUMENTS

2009/0175229 A1* 7/2009 Tseng .................. H04W 28/065
370/329
2009/0303954 A1* 12/2009 Guo ........................ H04L 47/14
370/329
(Continued)

FOREIGN PATENT DOCUMENTS

GB       2494633 A      3/2013
JP    2012-523146 A      9/2012
(Continued)

OTHER PUBLICATIONS

3GPP TR 36.843 V1.0.0 (Nov. 2013), "3rd Generation Partnership Project; Technical Specification Group RAN; Study on LTE Device to Device Proximity Services-Radio Aspects", (Release 12), pp. 1-32.
(Continued)

Primary Examiner — Chi H Pham
Assistant Examiner — Weibin Huang
(74) Attorney, Agent, or Firm — Birch, Stewart, Kolasch & Birch, LLP

(57) ABSTRACT

A terminal apparatus according to one aspect of the present invention constitutes and reports an amount-of-transmission-buffer report to be notified to a base station apparatus, based on first transmission data to the base station apparatus, which is prepared in a transmission buffer of the terminal apparatus itself, second transmission data for device-to-device data communication, and a priority level of each piece of transmission data.

7 Claims, 9 Drawing Sheets

(51) Int. Cl.
  *H04W 28/02* (2009.01)
  *H04W 72/04* (2009.01)
  *H04W 72/12* (2009.01)
  *H04W 88/06* (2009.01)
  *H04W 88/08* (2009.01)

(52) U.S. Cl.
  CPC ..... *H04W 72/1215* (2013.01); *H04W 76/023* (2013.01); *H04W 88/06* (2013.01); *H04W 88/08* (2013.01)

(56) References Cited

U.S. PATENT DOCUMENTS

| | | | |
|---|---|---|---|
| 2012/0069805 A1 | 3/2012 | Feuersanger et al. | |
| 2013/0322413 A1 | 12/2013 | Pelletier et al. | |
| 2014/0023008 A1 | 1/2014 | Ahn et al. | |
| 2014/0038629 A1* | 2/2014 | Iwamura | H04W 24/10 455/452.1 |
| 2015/0003371 A1* | 1/2015 | Park | H04W 52/0238 370/329 |
| 2015/0071212 A1* | 3/2015 | Kim | H04W 72/042 370/329 |
| 2015/0163689 A1* | 6/2015 | Lee | H04W 76/023 370/328 |
| 2015/0172037 A1* | 6/2015 | Morita | H04W 76/023 370/329 |
| 2017/0188349 A1* | 6/2017 | Lee | H04W 72/048 |

FOREIGN PATENT DOCUMENTS

| | | |
|---|---|---|
| JP | 2012-227885 A | 11/2012 |
| WO | WO 2009/104929 A1 | 8/2009 |

OTHER PUBLICATIONS

3GPP TSG-RAN WG2 #85, Tdoc R2-140625, Prague, Czech Republic, Feb. 10-14, 2014, "Resource allocation for D2D transmitters in coverage", 7.5.3. Ericsson, pp. 1-5.

3GPP TSG-RAN Working Group 2 meeting #85bis, R2-141854, Valencia, Spain, Mar. 31-Apr. 4, 2014, "Report of 3GPP TSG RAN WG2 meeting #85, Prague, Czech Republic, Feb. 10-14, 2013", 2.2, ETSI MCC, pp. 1-155.

* cited by examiner

TERMINAL APPARATUS, BASE STATION APPARATUS, COMMUNICATION SYSTEM, NOTIFICATION METHOD, AND INTEGRATED CIRCUIT

TECHNICAL FIELD

Embodiments of the present invention relate to a technology associated with a terminal apparatus, a base station apparatus, a communication system, a notification method, and an integrated circuit, in all of which a transmission resource request for device-to-device communication is efficiently performed.

This application claims the benefit of Japanese Priority Patent Application No. 2014-057363 filed on Mar. 20, 2014, the entire contents of which are incorporated herein by reference.

BACKGROUND ART

In 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency and time units, which is referred to as an Orthogonal Frequency-Division Multiplexing (OFDM) communication scheme or a resource block.

Furthermore, in 3GPP, discussions on Advanced EUTRA that realizes higher-speed data transfer and has forward compatibility with EUTRA have taken place.

In Advanced EUTRA, introduction of inter-terminal apparatus (Device to Device (D2D)) communication is considered. A mechanism (ProSe Didcovery), as a service between terminal apparatuses in proximity to each other (Proximity based Services (ProSe)), for checking (discovering) in the D2D communication whether or not the terminal apparatuses are located close to each other, a mechanism (Prose Communication) (which is also referred to as device-to-device data communication) for the terminal apparatus to perform communication without involving the base station apparatus, or the like are mainly considered (NPL 1).

CITATION LIST

Non-Patent Document

[Non-Patent Document 1] NPL 1: 3GPP TS 36.843 V1.0.0 (2013-11) http://www.3gpp.org/DynaReport136843.htm

[Non-Patent Document 2] NPL 2: Draft Report of 3GPP TSG RAN WG2 meeting #85 http://www.3gpp.org/ftp/tsg_ran/WG2_RL2/TSGR2_85/Report/

[Non-Patent Document 3] NPL 3: R2-140625, Ericsson, "Resource allocation for D2D transmitters in coverage" http://www.3gpp.org/ftp/tsg_ran/WG2_RL2/TSGR2_85/Docs/R2-140625.zip

DISCLOSURE OF THE INVENTION

Problems to be Solved by the Invention

In NPL 2, it is disclosed that a communication resource for inter-terminal apparatus communication (device-to-device data communication) is configured by the base station apparatus. For example, a method in which the base station apparatus notifies the terminal apparatus of a reception resource that is used for the inter-terminal apparatus communication, with broadcast information or a fixed configuration and, based on a resource request from the terminal apparatus, a transmission resource that is used for the inter-terminal apparatus communication is allocated to the terminal apparatus, a method in which the base station apparatus notifies the terminal apparatus of a transmission and reception resource that is used for the inter-terminal apparatus communication, with broadcast information or a fixed configuration, and the terminal apparatus independently selects the transmission resource from among the notified resources, or the like is disclosed.

However, in NPL 2, what method the terminal apparatus uses to acquire the transmission resource is not disclosed as a specific method.

Furthermore, in NPL 3, it is disclosed that, based on the resource request from the terminal apparatus, a new message in which a Buffer Status Report (BSR) that is a message for reporting an existing transmission buffer status is applied to the device-to-device data communication is introduced as means of allocating to the terminal apparatus the transmission resource that is used for the inter-terminal apparatus communication, but it is not disclosed how a Buffer Status Report that is used for communication with a current base station apparatus and a Buffer Status Report that is used for the device-to-device data communication are transmitted to the base station apparatus.

Particularly, when the number of bits in which the Buffer Status Report can be sent is limited, a case is considered where the Buffer Status Report that is used for the communication with the base station apparatus and the Buffer Status Report that is used for the device-to-device data communication are difficult to send at the same time.

Embodiments of the present invention relate to a terminal apparatus, a base station apparatus, a communication system, a notification method, and an integrated circuit, in all of which a transmission resource request for device-to-device data communication is efficiently performed.

Means for Solving the Problems (1) According to an embodiment of the present invention, there is provided a terminal apparatus which performs data communication with a base station apparatus, and inter-terminal apparatus data communication (device-to-device data communication), which does not involve the base station apparatus, the terminal apparatus including means of constituting and reporting an amount-of-transmission-buffer report to be notified to the base station apparatus, based on first transmission data to the base station apparatus, which is prepared in a transmission buffer of the terminal apparatus itself, second transmission data for the device-to-device data communication, and a priority level of each piece of transmission data.

(2) Furthermore, in the terminal apparatus according to the embodiment of the present invention, the amount-of-transmission-buffer report may be an amount-of-transmission-buffer report that is reported using a padding region of an uplink resource that is allocated to the terminal apparatus itself, and, in a case where the padding region is not able to include an amount-of-transmission-buffer report for the first transmission data, and an amount-of-transmission-buffer report for the second transmission data, based on the priority level, it may be determined which transmission data the amount-of-transmission-buffer reports that is changed to a short format is for.

(3) Furthermore, in the terminal apparatus according to the embodiment of the present invention, the amount-of-transmission-buffer report may be an amount-of-transmission-buffer report that is reported using a padding region of an uplink resource that is allocated to the terminal apparatus itself, and, in a case where the padding region is not able to include an amount-of-transmission-buffer report for the first transmission data, and an amount-of-transmission-buffer report for the second transmission data, any amount-of-transmission-buffer report for the transmission data that is configured to have a high priority level may be included in the amount-of-transmission-buffer report to be notified to the base station apparatus.

(4) Furthermore, according to another embodiment of the present invention, there is provided a base station apparatus that allocates to a terminal apparatus a transmission resource for inter-terminal apparatus data communication (device-to-device data communication), which does not involve the base station apparatus, the base station apparatus including means of notifying the terminal apparatus of information for identifying which one of the first transmission data and the second transmission data has a high priority level, for an amount-of-transmission-buffer report for first transmission data to the base station apparatus, which is prepared in a transmission buffer of the terminal apparatus, and second transmission data for the device-to-device data communication.

(5) Furthermore, according to still another embodiment of the present invention, there is provided a communication system including: a terminal apparatus that performs inter-terminal apparatus data communication (device-to-device data communication), which does not involve a base station apparatus; and the base station apparatus that allocates to the terminal apparatus a transmission resource for the device-to-device data communication, in which the base station apparatus includes means that notifies the terminal apparatus of information for identifying which one of the first transmission data and the second transmission data has a high priority level, for an amount-of-transmission-buffer report for first transmission data to the base station apparatus, which is prepared in a transmission buffer of the terminal apparatus, and second transmission data for the device-to-device data communication, and in which, the terminal apparatus includes means that constitutes and reports an amount-of-transmission-buffer report to be notified to the base station apparatus, based on the first transmission data to the base station apparatus, which is prepared in the transmission buffer of the terminal apparatus itself, the second transmission data for the device-to-device data communication, and the notified information.

(6) Furthermore, according to still another embodiment of the present invention, there is provided a notification method that is applied to a terminal apparatus that performs inter-terminal apparatus data communication (device-to-device data communication), which does not involve a base station apparatus, the notification method at least including a step of constituting and reporting an amount-of-transmission-buffer report to be notified to the base station apparatus, based on first transmission data to the base station apparatus, which is prepared in a transmission buffer of the terminal apparatus itself, second transmission data for the device-to-device data communication, and information for identifying which one of the first transmission data and the second transmission data has a high priority level.

(7) Furthermore, according to still another embodiment of the present invention, there is provided a notification method that is applied to a base station apparatus that allocates to a terminal apparatus a transmission resource for inter-terminal apparatus data communication (device-to-device data communication), which does not involve the base station apparatus, the notification method at least including a step of notifying the terminal apparatus of information for identifying which one of first transmission data and second transmission data has a high priority level, for an amount-of-transmission-buffer report for the first transmission data to the base station apparatus, which is prepared in a transmission buffer of the terminal apparatus, and the second transmission data for the device-to-device data communication.

(8) Furthermore, according to still another embodiment of the present invention, there is provided an integrated circuit that is built into a terminal apparatus that performs inter-terminal apparatus data communication (device-to-device data communication), which does not involve a base station apparatus, the integrated circuit causing the terminal apparatus to perform: a function of constituting and reporting an amount-of-transmission-buffer report to be notified to the base station apparatus, based on first transmission data to the base station apparatus, which is prepared in a transmission buffer of the terminal apparatus itself, second transmission data for the device-to-device data communication, and information for identifying which one of the first transmission data and the second transmission data has a high priority level.

(9) Furthermore, according to still another embodiment of the present invention, there is provided an integrated circuit that is built into a base station apparatus that allocates to a terminal apparatus a transmission resource for inter-terminal apparatus data communication (device-to-device data communication), which does not involve the base station apparatus, the integrated circuit causing the base station apparatus to perform: a function of notifying the terminal apparatus of information for identifying which one of first transmission data and second transmission data has a high priority level, for an amount-of-transmission-buffer report for the first transmission data to the base station apparatus, which is prepared in a transmission buffer of the terminal apparatus, and the second transmission data for the device-to-device data communication.

Effects of the Invention

As described above, according to embodiments of the present invention, a technology can be provided that relates to a terminal apparatus, a base station apparatus, a communication system, a notification method, and an integrated circuit, in all of which a transmission resource request for device-to-device data communication is efficiently performed.

MODE FOR CARRYING OUT THE INVENTION

Figure 1:
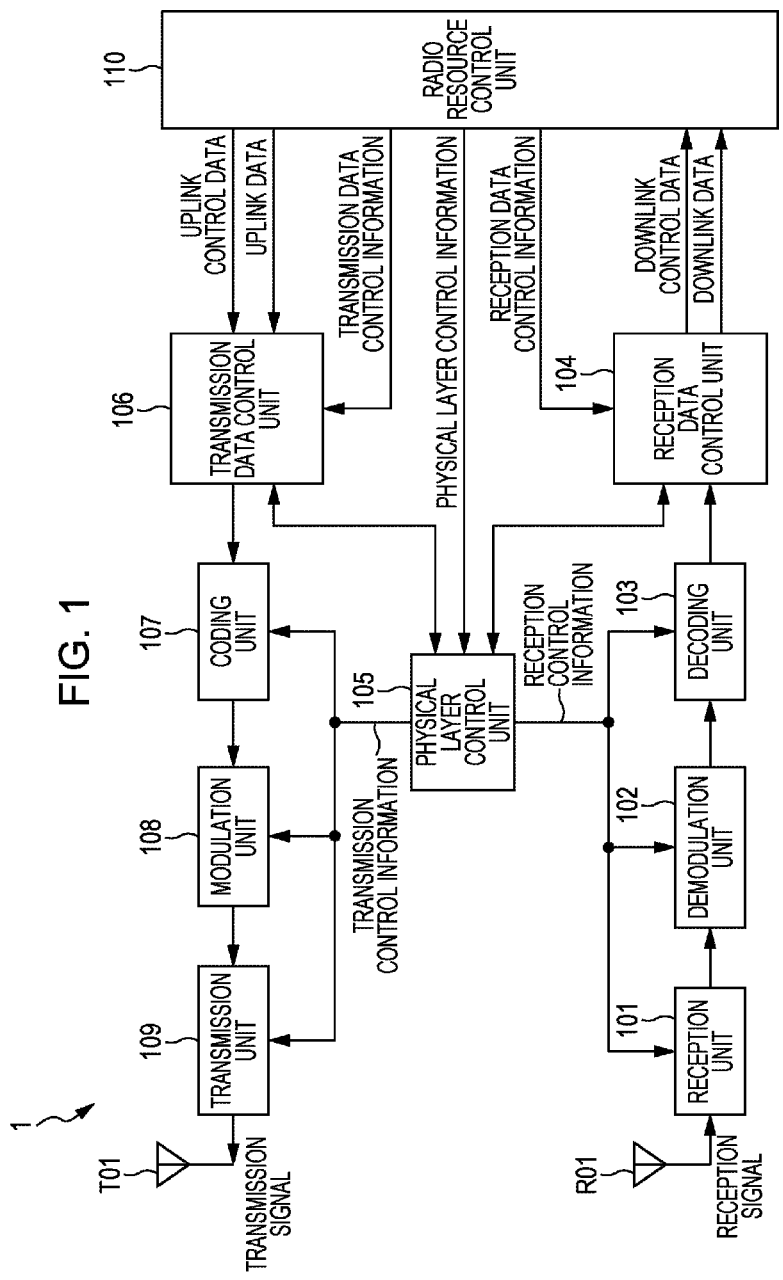
FIG. 1 is a block diagram illustrating one example of a schematic constitution of a terminal apparatus according to an embodiment of the present invention.

A technology relating to each embodiment of the present invention will be described briefly below.

[Physical Channel/Physical Signal]

Physical channels and physical signals that are mainly used in EUTRA and Advanced EUTRA are described. A channel means a medium that is used for signal transmission and reception, and a Physical Channel means a physical medium that is used for the signal transmission and reception. According to the present invention, the Physical Channel and the signal can be used synonymously. There is a likelihood that in EUTRA and Advanced EUTRA, the Physical Channel will be added in future or an architecture or format type thereof will be changed or added, but this change or addition does not have any influence on a description of each embodiment of the present invention.

In EUTRA and Advanced EUTRA, scheduling of the Physical Channel or the physical signal is managed using a radio frame. One radio frame is 10 ms, and one radio frame is constituted from 10 subframes. In addition, one subframe is constituted from two slots (that is, one subframe is 1 ms and one slot is 0.5 ms). Furthermore, management is performed using a resource block as a minimum unit for scheduling for allocating the physical Channel. The resource block is defined by a fixed frequency domain that is constituted from a set of multiple subcarriers (for example, 12 subcarriers) along a frequency axis and by a domain that is constituted from a fixed transmission time interval (1 slot).

A Synchronization Signal is constituted from 3 types of primary synchronization signals and a secondary synchronization signal that is constituted from 31 types of codes which are alternately arranged in the frequency domain. With a combination of these signals, the primary synchronization signal and the secondary synchronization signal, 504 cell identifiers (physical cell IDs (Physical Cell Identities (PCIs))) for identifying a base station apparatus and a frame timing for wireless synchronization are indicated. A terminal apparatus specifies the physical cell ID of the Synchronization Signal that is received through cell search.

A Physical Broadcast CHannel (PBCH) is transmitted for the purpose of notifying (configuring) a control parameter (broadcast information (System Information (SI))) that is used in a shared manner in terminal apparatuses within a cell. When it comes to the broadcast information that is not notified on the Physical Broadcast Channel, a radio resource with which the broadcast information is transmitted on a Physical Downlink Control Channel is notified to the terminal apparatus within the cell, and with the notified radio resource, a layer 3 message (system information) that notifies the broadcast information using a Physical Downlink Shared Channel is transmitted.

As pieces of broadcast information, a Cell Global Identifier (CGI) indicating a cell-dedicated identifier, a Tracking Area Identifier (TAI) for managing a waiting area by paging, random access configuration information, transmission timing adjustment information, shared radio resource configuration information in the cell, neighboring cell information, uplink access limitation information, and the like are notified.

Downlink reference signals are categorized by their usage into multiple types. For example, a cell-specific RS (Cell-specific Reference Signals (CRS)) is a pilot signal that is transmitted with a prescribed power for every cell, and is a downlink reference signal that is periodically iterated in the frequency domain and the time domain based on a prescribed rule. The terminal apparatus measures received quality for every cell by receiving the cell-specific RS. Furthermore, the terminal apparatus uses a downlink cell-specific RS also as a reference signal for demodulation of the Physical Downlink Control Channel that is transmitted at the same time as the cell-specific RS, or of the Physical Downlink Shared Channel. As a sequence that is used for the cell-specific RS, a sequence that is identifiable for every cell is used.

Furthermore, the downlink reference signal is also used for estimation of propagation fluctuation in downlink. The downlink reference signal that is used for the estimation of the propagation fluctuation is referred to as a Channel State Information Reference Signals (CSI-RS). Furthermore, the downlink reference signal that is configured, in a dedicated manner, for the terminal apparatus is referred to as UE-specific Reference Signals (URS) or Dedicated RS (DRS), and is referred to for channel compensation processing of the channel that is to be performed when demodulating the Physical Downlink Control Channel or the Physical Downlink Shared Channel.

A Physical Downlink Control Channel (PDCCH) is transmitted in several OFDM symbols (for example, 1 to 4 OFDM symbols) starting from the head of each subframe. An Enhanced Physical Downlink Control Channel (EPDCCH) is a Physical Downlink Control Channel that is allocated to the OFDM symbols to which the Physical Downlink Shared Channel (PDSCH) is allocated. The PDCCH or the EPDCCH is used for the purpose of notifying radio resource allocation information in accordance with the scheduling by the base station apparatus for the terminal apparatus, or information indicating an amount of adjustment for an increase or decrease in transmit power. Unless otherwise specified, the Physical Downlink Control Channel (PDCCH) that will be described below means both of the Physical Channels, the PDCCH and the EPDCCH.

The terminal apparatus monitors the Physical Downlink Control Channel that is destined for the terminal apparatus itself before transmitting and receiving a layer 2 message and the layer 3 message (paging, a handover command, or the like) that are downlink data or downlink control data, and receives the Physical Downlink Control Channel that is destined for the terminal apparatus itself. Thus, the terminal apparatus needs to acquire from the Physical Downlink Control Channel the radio resource allocation information that is referred to as an uplink grant at the time of the transmission and as a downlink grant (a downlink assignment) at the time of the reception. Moreover, in addition to being transmitted in the OFDM symbol described above, it is possible that the Physical Downlink Control Channel is also constituted to be transmitted in a region of the resource block that is allocated in a dedicated manner from the base station apparatus to the terminal apparatus.

A Physical Uplink Control CHannel (PUCCH) is used for an acknowledgement response (ACKnowledgement/Negative ACKnowledgement (ACK/NACK)) for reception of data that is transmitted on the Physical Downlink Shared Channel, for downlink channel (channel state) information (Channel State Information (CSI)), or for making an uplink radio resource allocation request (a radio resource request or a Scheduling Request (SR)).

Pieces of CSI include a Channel Quality Indicator (CQI), a Precoding Matrix Indicator (PMI), a Precoding Type Indicator (PTI), and a Rank Indicator (RI). Each Indicator may be expressed as Indication.

The Physical Downlink Shared Channel (PDSCH) is also used for notifying the terminal apparatus of the broadcast information (the system information) that is not notified by the paging or on the physical broadcast channel, as the layer 3 message, in addition to the downlink data. The radio resource allocation information of the Physical Downlink Shared Channel is indicated with the Physical Downlink Control Channel. The Physical Downlink Shared Channel is transmitted in a state of being allocated to OFDM symbols other than the OFDM symbols in which the Physical Downlink Control Channel is transmitted. That is, the Physical Downlink Shared Channel and the Physical Downlink Control Channel are time-multiplexed within one subframe.

It is possible that uplink data and uplink control data mainly transmitted on a Physical Uplink Shared Channel (PUSCH), and that the PUSCH includes control data, such as the received quality of the downlink or the ACK/NACK. Furthermore, the Physical Uplink Shared Channel (PUSCH) is also used for the terminal apparatus to notify the base station apparatus of uplink control information as the layer 3 message, in addition to the uplink data. Furthermore, as is the case in the downlink, the radio resource allocation information of the Physical Uplink Shared Channel is indicated with the Physical Downlink Control Channel.

Included in an Uplink Reference Signal (which is also referred to as an uplink reference signal, a pilot signal, or an uplink pilot channel) are a Demodulation Reference Signal (DMRS) that is used for the base station apparatus to demodulate the Physical Uplink Control Channel (PUCCH) and/or the Physical Uplink Shared Channel (PUSCH) and a Sounding Reference Signal (SRS) that is used for the base station apparatus to mainly estimate an uplink channel state. Furthermore, as the Sounding Reference Signals, there are a periodic Sounding Reference Signal (Periodic SRS) that is periodically transmitted and an aperiodic Sounding Reference Signal (Aperiodic SRS) that is transmitted when there is an instruction to transmit the Aperiodic SRS from the base station apparatus.

A Physical Random Access Channel (PRACH) is a channel that is used for notifying (configuring) a preamble sequence, and has a guard time. The preamble sequence is constituted in such a manner that information is notified to the base station apparatus with multiple sequences. For example, in a case where 64 types of sequences are prepared, 6-bit information can be indicated to the base station apparatus. The Physical Random Access Channel is used as a means by which the terminal apparatus has access to the base station apparatus.

The terminal apparatus uses the Physical Random Access Channel in order to make an uplink radio resource request when the Physical Uplink Control Channel is not configured, to make a request to the base station apparatus for the transmission timing adjustment information (which is also referred to as timing advance (TA)) indispensable for adjusting an uplink transmission timing to a reception timing window of the base station apparatus, or to perform an operation like this. Furthermore, the base station apparatus can also make a request to the terminal apparatus for starting of a random access procedure using the Physical Downlink Control Channel.

In addition, there is a D2D synchronization signal (D2DSS) that a device which is a synchronization source transmits in order to be synchronized for D2D communication. In a case where the base station apparatus is the synchronization source, the primary synchronization signal and the secondary synchronization signal are used as the D2DSS. In a case where the synchronization source is other than the base station apparatus, a primary D2D synchronization signal (PD2DSS) that is a Zadoff-Chu sequence and a secondary D2D synchronization signal (SD2DSS) that is an M sequence are used as the D2DSS. Furthermore, a physical D2D synchronization channel (PD2DSCH) on which an identifier of a synchronization source apparatus, a type of synchronization source apparatus, a control signal, and the like are notified is considered.

Moreover, detailed descriptions of Physical Channels or physical signals other than these are omitted because they have no relationship with each embodiment of the present invention. As Physical Channels or physical signals of which the descriptions are omitted, there are a Physical Control Format Indicator CHannel (PCFICH), a Physical Hybrid ARQ Indicator CHannel (PHICH), a Physical Multicast CHannel (PMCH) and the like.

[Wireless Network]

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. Furthermore, when cells that are covered by different types of base station apparatuses or that have different radii are present in a mixed manner in an area where the same frequency or different frequencies are available and one communication system is formed, this wireless network is referred to as a heterogeneous network.

The terminal apparatus regards the inside of the cell as the communication area, and as such operates. When the terminal apparatus moves from a certain cell to a different cell, the terminal apparatus moves to a separate suitable cell by a cell re-selection procedure at the time of a non-wireless connection (which is also referred to as an idle state or an RRC_IDLE state) and by a handover procedure at the time of a wireless connection (which is also referred to as a connected state or RRC_CONNECTED state). The suitable cell indicates a cell in which it is determined that, generally, the access by the terminal apparatus is not allowed based on information that is designated from the base station apparatus, and in which the received quality of the downlink satisfies a prescribed condition.

The base station apparatus manages a certain cell that is an area where it is possible that the terminal apparatus performs communication, from one frequency to another. One base station apparatus may manage multiple cells.

When it is possible that the terminal apparatus communicates with a certain base station apparatus, among cells that are covered by the certain base station apparatus, a cell that is configured in such a manner that the cell is used for communication with the terminal apparatus is referred to as a Serving Cell, the other cells that are not used for the communication are referred to as Neighboring cells.

[Structure of a Wireless Protocol]

Figure 6:
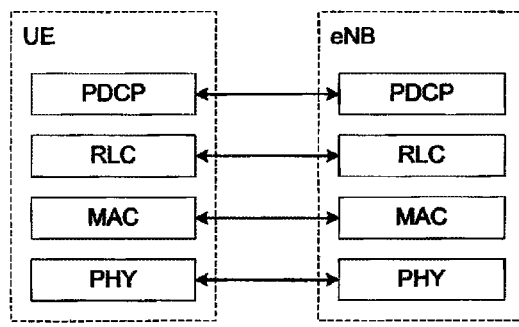
FIG. 6 is a diagram illustrating a User-plane (U-Plane (UP)) protocol stack according to the embodiment of the present invention.

FIG. 6 is a diagram illustrating a User-plane (U-Plane) (UP) protocol stack that handles user data of the terminal apparatus and the base station apparatus on an EUTRA wireless network (EUTRAN). Furthermore, FIG. 7 is a diagram illustrating a Control-plane (C-Plane) (CP) protocol stack that handles control data.

Figure 7:
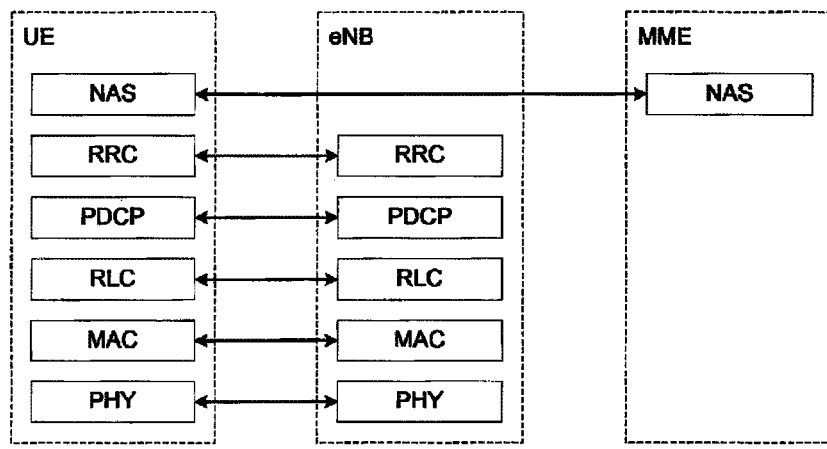
FIG. 7 is a diagram illustrating a Control-plane (C-Plane (CP)) protocol stack according to the embodiment of the present invention.

In FIGS. 6 and 7, a Physical layer (PHY layer) provides a transfer service to a higher layer using a Physical Channel. The PHY layer is connected to a higher-level Medium Access Control layer (MAC layer) with a transport channel. Through the transport channel, data moves between layers, the MAC layer and the PHY layer. Between the PHY layers of the terminal apparatus and the base station apparatus, data transmission and reception are performed through the Physical Channel.

The MAC layer performs mapping of various logical channels on various transport channels. The MAC layer is connected to a higher-level Radio Link Control layer (RLC layer) with a logical channel. The logical channel is broadly divided by a type of information that is transferred, and is divided into a control channel on which control information is transferred and a traffic channel on which user information is transferred. In order to perform intermittent reception and transmission (DRX and DTX), the MAC layer has a function of performing control of the PHY layer, a function of executing the random access procedure, a function of notifying information on the transmit power, a function of performing HARQ control, and the like.

The RLC layer performs Segmentation and Concatenation of data that is received from the higher layer, and adjusts a data size in such a manner that a lower layer can suitably perform data transmission. Furthermore, the RLC layer has a function for guaranteeing Quality of Service (QoS) that is requested by each piece of data. That is, the RLC layer has a function, such as data re-transmission control.

In order to efficiently transfer in a wireless section an IP packet that is the user data, a Packet Data Convergence Protocol layer (PDCP layer) has a header compression function of performing compression of unnecessary control information. Furthermore, the PDCP layer also has a data coding function.

In addition, as the control-plane protocol stack, there is a Radio Resource Control layer (RRC layer). The RRC layer performs configuration or reconfiguration of a Radio Bearer (RB), and performs control of the logical channel, the transport channel, and the Physical Channel. The RB is divided into a Signaling Radio Bearer (SRB) and a Data Radio Bearer (DRB), and the SRB is used as a path along which an RRC message that is the control information is transmitted. The DRB is used as a path along which the user data is transmitted. Configuration of each RB is performed between the RRC layers of the base station apparatus and the terminal apparatus.

The PHY layer corresponds to a physical layer that is the first layer in a hierarchical structure of the Open Systems Interconnection (OSI) model, the MAC layer, and the RLC layer and the PDCP layer correspond to a data link layer that is the second layer of the OSI model, and the RRC layer corresponds to a network layer that is the third layer of the OSI model.

Furthermore, a signaling protocol that is used between the network and the terminal apparatus is divided into an Access Stratum (AS) protocol and a Non-Access Stratum (NAS) protocol. For example, a protocol of a layer that is the RRC layer or below the RRC layer is the access stratum protocol that is used between the terminal apparatus and the base station apparatus. Furthermore, protocols, such as Connection Management (CM) and Mobility Management (MM) of the terminal apparatus, are the Non-Access Stratum protocols, and are used between the terminal apparatus and a core network (CN). For example, as illustrated in FIG. 7, communication that uses the Non-Access Stratum protocol is performed transparently, through the base station apparatus, between the terminal apparatus and a Mobility Management Entity (MME).

[Random Access Procedure]

The random access procedure will be described below. As the random access procedures, there are two access procedures, a contention-based Random Access procedure and a non-contention based Random Access procedure.

The contention-based Random Access procedure is a random access procedure in which there is a likelihood that contention will take place between mobile station apparatuses, and is performed at a Scheduling Request, such as the time from a state where a connection (communication with) to the base station apparatus is not made to when initial access takes place or a case where the connection to the base station apparatus is made, but uplink data transmission takes place to the mobile station apparatus in a state where uplink synchronization is no longer maintained.

The non-contention based Random Access procedure is a random access procedure in which the contention does not take place between the mobile station apparatuses. In order to quickly achieve the uplink synchronization between the mobile station apparatus and the base station apparatus in a case where a connection is made between the base station apparatus and the mobile station apparatus but the uplink synchronization is no longer maintained, in a special case such as a case where the handover or the transmission timing for the mobile station apparatus is not enabled, the mobile station apparatus starts the random access procedure when is instructed by the base station apparatus to do so. An instruction to execute the non-contention based Random Access procedure is provided using a Radio Resource Control (RRC) (Layer 3) layer message and control data on the Physical Downlink Control Channel (PDCCH).

Figure 8:
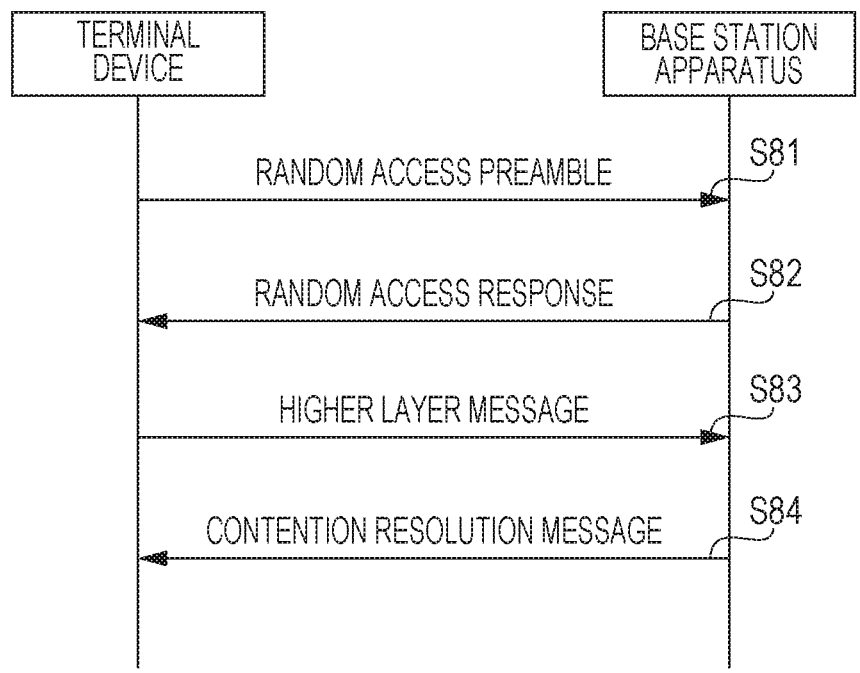
FIG. 8 is a sequence chart illustrating one example relating to a contention-based random access procedure according to the embodiment of the present invention.

The contention-based Random Access procedure is described briefly referring to FIG. 8. First, the terminal apparatus transmits a random access preamble to the base station apparatus (message 1: (1) in Step S81). Then, the base station apparatus that receives the random access preamble transmits a response (a random access response) to the random access preamble to the terminal apparatus (message 2: (2) in Step S82). The terminal apparatus transmits a higher layer (Layer 2/Layer 3) message, based on scheduling information that is included in the random access response (message 3: (3) in Step S83). The base station apparatus transmits a contention resolution message to the terminal apparatus that receives the higher layer message of (3) (message 4: (4) in Step S84). Moreover, the contention-based Random Access is also referred to as random preamble transmission.

Figure 9:
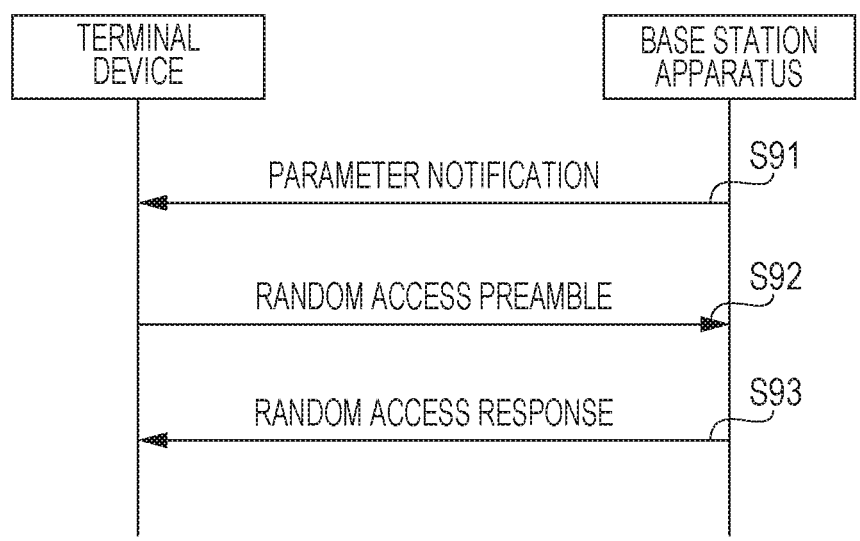
FIG. 9 is a sequence chart illustrating one example relating to a non-contention based random access procedure according to the embodiment of the present invention.

Next, the non-contention based Random Access procedure is described briefly referring to FIG. 9. First, the base station apparatus notifies the terminal apparatus of a preamble number (or a sequence number) and a random access channel number to be used (message 0: (1)' in Step S91). The terminal apparatus transmits the random access preamble of the designated preamble number to a designated Random Access Channel (RACH) (message 1: (2)' in Step S92). Then, the base station apparatus that receives the random access preamble transmits the response (the random access response) to the random access preamble to the terminal apparatus (message 2: (3)' in Step S93). However, in a case where a value of the notified preamble number is 0, the contention-based Random Access procedure is executed. Moreover, the non-contention based Random Access procedure is also referred to as dedicated preamble transmission.

[Uplink Data Transmission]

Uplink data transmission will be described below. The Physical Uplink Control Channel (PUCCH) is used for a response (an ACK/NACK of) to the downlink data that is transmitted on the Physical Downlink Shared Channel (PDSCH) and for transmission of wireless channel quality information (a Channel Quality Indicator (CQI)) of the downlink and a transmission request (Scheduling Request (SR)) for the uplink data. In a case where the terminal apparatus makes the transmission request for the uplink data, the terminal apparatus transmits the Scheduling Request to the base station apparatus using the Physical Uplink Control Channel (PUCCH) that is allocated by the base station apparatus.

After the transmission of the Scheduling Request, in a case where the base station apparatus allocates a resource for the Physical Uplink Shared Channel (PUSCH), the terminal apparatus transmits a Buffer Status Report (BSR) indicating a buffer status information of data that is transmitted, on the allocated resource for the Physical Uplink Shared Channel (PUSCH), by the terminal apparatus. Moreover, the base station apparatus performs uplink data scheduling on the terminal apparatus based on the Buffer Status Report.

After the transmission of the Scheduling Request, in a case where the base station apparatus does not allocate the resource for the Physical Uplink Shared Channel (PUSCH), the terminal apparatus again transmits the Scheduling Request. Although the retransmission of the Scheduling Request is iterated, in a case where the base station apparatus does not allocate the resource for the Physical Uplink Shared Channel (PUSCH), the terminal apparatus releases the Physical Uplink Control Channel (PUCCH) that is not allocated and the Uplink Reference Signal, and executes the random access procedure that is intended for the Scheduling Request. Moreover, in the Scheduling Request using the random access procedure, the terminal apparatus transmits the Buffer Status Report with message 3.

[MAC PDU]

Protocol Data Units (PDUs) of the MAC layer is described. A MAC PDU has a length of integral multiples of one byte (8 bits). For the MAC PDU, multiple formats are present according to its application, but at this point, a MAC PDU for a Transparent MAC (MAC), a random access response, a random access response, a Downlink Shared Channel (DL-SCH) excluding an MCH, and an Uplink Shared Channel (UL-SCH) is described.

Figure 10:
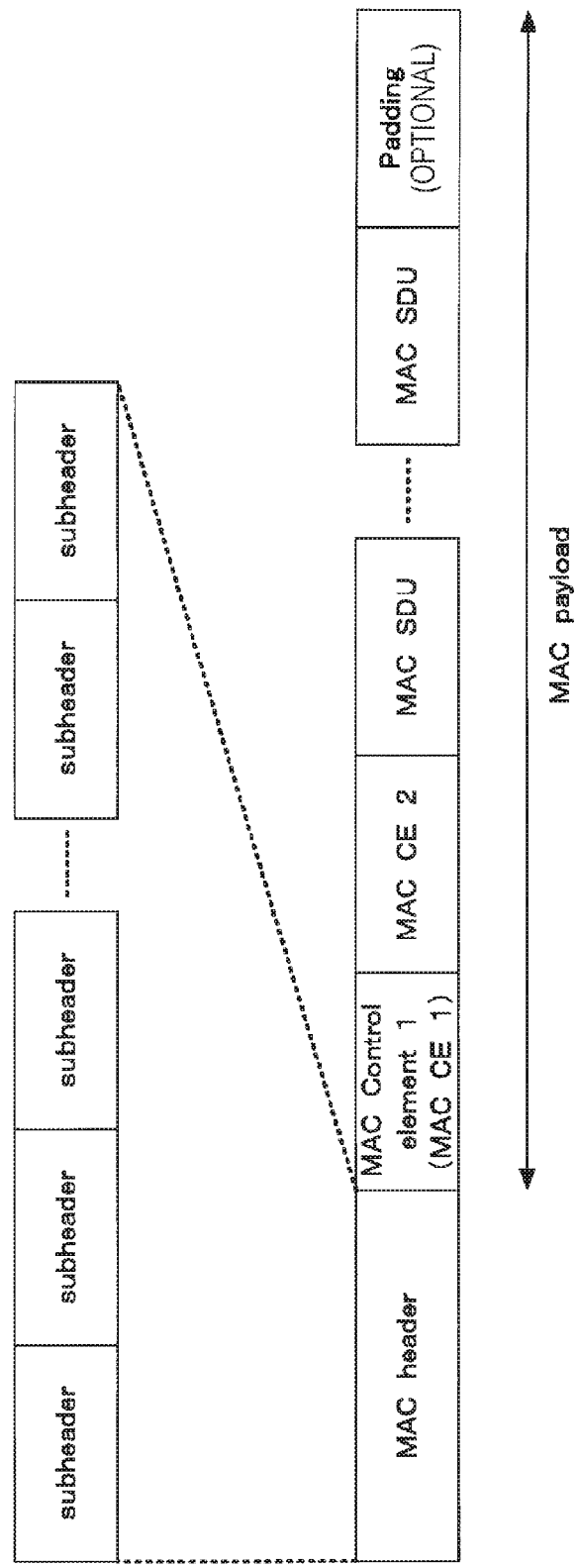
FIG. 10 is a diagram illustrating a constitution of Protocol Data Units (PDUs) of a MAC layer according to the embodiment of the present invention.

As illustrated in FIG. 10, the MAC PDU is constituted from a MAC header and a MAC payload. In addition, the MAC payload is constituted from a MAC Control element (MAC CE), and a Service Data Unit (MAC SDU) and Padding. Furthermore, the MAC header is constituted from one or more MAC PDU subheaders that correspond to contents of the MAC payload, and the sequence of each MAC PDU subheader is the same as the sequence of each of the MAC CE, the MAC SDU, and the Padding that are included in the MAC payload. A logical channel identifier (LCID) is included in each MAC PDU subheader, and a type of data that is included in the MAC payload is determined by the logical channel identifier. Furthermore, the MAC CE that is included in the MAC payload is positioned ahead of the MAC SDU. That is, in the MAC header, the MAC PDU subheader of the LCID indicating the MAC CE is positioned ahead of the MAC PDU subheader of the LCID of the MAC SDU.

[Details of a Function of the MAC Layer]

A function of the MAC layer of the terminal apparatus will be described in more detail below. The MAC layer has a function of mapping each logical channel to the transport channel. Furthermore, the MAC layer has a function of generating transmission data from the logical channel according to a priority level. This procedure is referred to as a Logical Channel Prioritization (LCP) procedure. In the basic LCP procedure, a transmission priority level of the transmission data is determined considering a priority level of each logical channel and a Prioritized Bit Rate (PBR) that has to be transmitted within a fixed period, which corresponds to QoS of the radio bearer, and the transmission data is generated starting from data with the highest priority level at the point in time when the uplink grant is received. When making a connection to the base station apparatus, the MAC layer acquires pieces of information, such as a logical channel number of each RB, the priority level of the logical channel, and the PBR, for RRC layer.

Furthermore, the MAC layer has a function of notifying an amount of data (transmission buffer status) in a transmission buffer that corresponds to each logical channel. This function is referred to as the Buffer Status Report (BSR). Furthermore, the Buffer Status Report is also referred to as an amount-of-transmission-buffer report. With the BSR, each logical channel is allocated to a Logical Channel Group (LCG), and an amount of transmission buffer (a buffer status) for each LCG is notified, as a message (MAC CE) of the MAC layer, to the base station apparatus.

6-bit information is included in the Buffer Status Report in order to indicate the amount of transmission buffer, and any one of total 64 table (normal table) indexes, which results from adding up an index (0) indicating 0 bytes, 62-level indexes (from 1 to 62) indicating 1 to 150000 bytes, and indexes (63) indicating the number of bytes exceeding 150000 bytes, is reported. However, in order to report as great the number of bytes as is possible, in a case where extended BSR-Sizes are configured with an RRC layer message from the base station apparatus, any one of total 64 table (extended table) indexes, which results from adding up an index (0) indicating 0 bytes, 62-level indexes (from 1 to 62) indicating 1 to 3000000 bytes, and indexes (63) indicating the number of bytes exceeding 3000000 bytes, is reported as 6-bit information.

As the BSRs, there are a regular BSR, a padding BSR, and a periodic BSR. As conditions for triggering the BSR, there are several conditions. For example, when an uplink data that belongs to a certain logical channel is in a state of being able to be transmitted with the higher layer (the RLC or the PDCP), in a case where the uplink data has a higher priority level than a logical channel to which transmission data in a different state of being able to be transmitted belongs, or in a case where data in the state of being able to be transmitted is not present in any one of the logical channels, the regular BSR is triggered. Furthermore, when time check of a timer (retxBSR-Timer) expires, even in a case where the terminal apparatus has data that is in the state of being able to be transmitted on any one of the logical channels, the regular BSR is triggered. Furthermore, in a case where an uplink resource that is allocated to the terminal apparatus itself has a padding region as large as is indispensable for sending some portions or all portions of the BSR, the padding BSR is triggered. Furthermore, the periodic BSR is triggered with a predetermined periodicity (a periodicity that is designated with the timer (periodic BSR-Timer)). The SR is triggered due to the triggering of the regular BSR.

Moreover, as the BSRs, there are a Short BSR that uses a format suitable for reporting a buffer status of one logical channel Group, and a Long BSR that uses a format suitable for reporting a buffer status of multiple logical channel Groups. Furthermore, when it comes to the padding BSR, in a case where the buffer status of the multiple logical channel Groups is not transmitted, if there is no padding region for transmitting (in the same format as for the Short BSR) the buffer status of all the logical channel Groups, there is also a Truncated BSR for transmitting a BSR of the logical channel Group that includes a logical channel with a high priority level.

Furthermore, in a case where a condition for triggering the BSR is satisfied, if a radio resource (the Physical Uplink Share Channel (PUSCH)) for notifying the BSR is not allocated, the MAC layer is instructed to transmit the Scheduling Request (SR) to the PHY layer. After the radio resource is allocated, the MAC layer transmits the BSR. In a case where the MAC layer instructs the PHY layer to transmit the Scheduling Request, the PHY layer transmits the Scheduling Request using the Physical Uplink Control Channel (PUCCH). Moreover, in a case where the Physical Uplink Control Channel (PUCCH) for the transmission of the Scheduling Request is not allocated (is not enabled), the MAC layer instructs the PHY layer to make the Scheduling Request that uses the Physical Random Access Channel (PRACH).

Furthermore, in a case where the uplink resource for transmitting the BSR is allocated, the time check of the timer (retxBSR-Timer) is started or Restarted. Furthermore, in a case where all the BSRs to be transmitted are not the Truncated BSRs, the time check of the timer (periodicBSR-Timer) is started or Restarted.

Furthermore, in a case where uplink resource allocation can accommodate all pieces of pending data in the state of being able to be transmitted, but is not sufficient for adding and accommodating the BSR and a subheader thereof, the BSRs that are all triggered are canceled. Furthermore, even in a case where the BSR is included in the MAC PDU that is transmitted, the BSRs that are all triggered are canceled.

[D2D Communication]

A mechanism (ProSe Didcovery), as a service between the terminal apparatuses in proximity to each other (Proximity based Services (ProSe)), for checking (discovering) even during the D2D communication whether or not the terminal apparatuses are located close to each other, and a mechanism (ProSe Communication) for the terminal apparatus to perform communication without involving the base station apparatus are mainly considered.

Even in a state (RRC_CONNECTED state) in which wireless connection to the base station apparatus is established, and even in a state (RRC_IDLE state) in which the wireless connection to the base station apparatus is not established, transmission of ProSe Discovery message has to be performed.

Furthermore, even in a case where a signal or a message is transmitted between the terminal apparatuses, the transmission by the terminal apparatus may be under the control of a network. That is, although the terminal apparatus is in a non-wireless connection state, the network may be able to control a radio resource or a parameter for transmitting a ProSe Discovery signal or message, or a state (a wireless connection state or a non-wireless connection state) at the time of the transmission.

In ProSe Communication (device-to-device data communication), in a case where the communication is performed with group casting or broadcasting, a step of discovering a communication partner with ProSe Discovery is not necessarily indispensable.

Various ProSe Communication signals are considered, and a Physical Channel that has the same structure as EUTRA and the PUSCH may be used.

Furthermore, in the ProSe Communication, a resource for receiving Scheduling assignments (SA) is provided, as a resource that is to be used by the terminal apparatus, to the terminal apparatus. The terminal apparatus determines the presence or absence of data that is destined for the terminal apparatus itself, by receiving the SA in resources (the time and the frequency) that are designated as a resource pool. The resource pool may be configured in advance, be notified (broadcast) by the base station apparatus, and be notified (broadcast) by a different station apparatus.

In addition, as a method for the terminal apparatus to transmit the above-described SA, a method in which the terminal apparatus makes the transmission request to the base station apparatus, and in response to this, a transmission resource is allocated (which is hereinafter also referred to as Mode 1 or a scheduled type (Scheduled)), or a method in which the terminal uses as the transmission resource the broadcast information or a resource that is configured in advance (which is hereinafter also referred to Mode 2 or an autonomous type (Autonomous)) may be used.

In the ProSe Communication, in a case where one-to-M (M is a natural number) broadcasting communication is used, other multiple terminal apparatuses can receive a signal that is transmitted by a certain terminal apparatus, and it is possible that the terminal apparatus which performs the transmission and the terminal apparatus which performs the reception exchanges their roles. Furthermore, in the case of the purpose of public safety, the broadcasting communication needs to be performed even out of coverage by the base station apparatus. Furthermore, the broadcasting communication supports both of a dedicated frequency (Dedicated carrier) and a frequency that is used for a normal communication service in which the base station apparatus is involved. Furthermore, because the broadcasting communication is one-way communication, feedback with a layer 2 (the MAC/RLC/PDCP layer) is not assumed. That is, the communication is performed in an Unacknowledge Mode (UM) in which error correction using ARQ is not performed in the RLC layer, without performing retransmission control using the HARQ in the MAC layer. In the case of one-to-one communication, it is also considered that the above-described one-to-M broadcasting communication is applied (M=1), and it is also considered that the feedback with the layer 2 is performed by performing unicasting communication.

Considering the above-described matters, a suitable embodiment of the present invention will be described in detail below referring to the accompanying drawings. Moreover, when the embodiment of the present invention is described, in a case where it is determined that a specific description of a known function or constitution associated with the embodiment of the present invention makes the gist of the embodiment of the present invention indefinite, a detailed description thereof is omitted.

First Embodiment

A first embodiment of the present invention will be described in detail below.

FIG. 1 is a block diagram illustrating one example of a terminal apparatus 1 according to the first embodiment of the present invention. The present terminal apparatus 1 is constituted at least from a reception unit 101, a demodulation unit 102, a decoding unit 103, a reception data control unit 104, a physical layer control unit 105, a transmission data control unit 106, a coding unit 107, a modulation unit 108, a transmission unit 109, and a radio resource control unit 110. The "units" in the drawings are elements that are also expressed using the terms circuit, constituent element, device, unit, and the like and that realize a function of the terminal apparatus 1 and each procedure.

The radio resource control unit 110 is a block that performs each function of the Radio Resource Control (RRC) layer that executes Radio Resource Control of the terminal apparatus 1. Furthermore, the reception data control unit 104 and the transmission data control unit 106 are blocks that perform each function in the Medium Access Control (MAC) layer that manages the data link layer, the Radio Link Control (RLC) layer, and the Packet Data Convergence Protocol (PDCP) layer.

Moreover, the terminal apparatus 1 may be constituted to include some or all of blocks (the reception unit 101, the demodulation unit 102, and the decoding unit 103) in a reception system, and multiple frequencies (frequency bands and frequency bandwidths) and blocks (the coding unit 107, the modulation unit 108, and the transmission unit 109) in a transmission system, in order that, by using the carrier aggregation and/or the device-to-device communication, transmission and reception processing at multiple frequencies (frequency bands and frequency bandwidths) or within the same subframe of a cell is supported.

With regard to reception processing by the terminal apparatus 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal apparatus 1.

The physical layer control information is configured by a wireless connection resource configuration that is transmitted in a dedicated manner from a base station apparatus 2 to the terminal apparatus 1, cell-specific broadcast information, a system parameter, or the like, and, if need arises, is input by the radio resource control unit 110 into the physical layer control unit 105. The physical layer control unit 105 suitably input the reception control information, which is control information relating to the reception, to the reception unit 101, the demodulation unit 102, and the decoding unit 103.

Included in the reception control information are pieces of information, as downlink scheduling information, such as reception frequency band information, reception timing relating to the Physical Channel and the physical signal, a multiplexing method, and radio resource control information. Furthermore, the reception data control information is downlink control information that includes secondary cell deactivation timer information, DRX control information, multicast data reception information, downlink retransmission control information, and the like. Additionally, control information relating to the downlink in each of the MAC layer, the RLC layer, and the PDCP layer is included in the reception data control information.

The reception signal is received in the reception unit 101. The reception unit 101 receives a signal from the base station apparatus 2 in accordance with the frequency and the frequency band that are notified with the reception control information. The signal that is received is input into the demodulation unit 102. The demodulation unit 102 performs demodulation of the signal. The demodulation unit 102 input a post-demodulation signal into the decoding unit 103. The decoding unit 103 decodes the signal that is input, and inputs each piece of data (which is also referred to as downlink data, downlink control data, or a downlink transport block) that results from the decoding, into the reception data control unit 104. Furthermore, along with each piece of data, a MAC control element that is transmitted from the base station apparatus 2 is decoded in the decoding unit 103 as well, and related data is input into the reception data control unit 104.

The reception data control unit 104 performs control (for example, cell activation/deactivation, DRX control, transmission timing adjustment, and the like) of the physical layer control unit 105, which is based on the received MAC control element, performs buffering of each piece of data that results from the decoding, and performs error correction control (HARQ) of data that is retransmitted. Each piece of data that is input into the reception data control unit 104, that is, related data is input into (transferred to) the radio resource control unit 110.

With regard to transmission processing by the terminal apparatus 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information, as uplink scheduling information, such as coding information, modulation information, transmission frequency band information, transmission timing relating to the physical channel and the physical signal, the multiplexing method, and the radio resource arrangement information.

Furthermore, the transmission data control information is uplink control information that includes DTX control information, the random access configuration information, uplink shared channel information, logical channel priority information, resource request configuration information, cell group information, uplink retransmission control information, and the Buffer Status Report. The radio resource control unit 110 may configure multiple pieces of random access configuration information that correspond to multiple cells, respectively, for the transmission data control unit 106.

Furthermore, the radio resource control unit 110 manages the transmission timing adjustment information and the transmission timing timer that are used for adjustment of the uplink transmission timing, and manages an uplink transmission timing state (a transmission timing adjusted state or a transmission timing unadjusted state) for every cell (every cell group or every TA group). The transmission timing adjustment information and the transmission timing timer is included in the transmission data control information.

Moreover, in a case where there is a need to manage multiple uplink transmission timing states, the transmission data control unit 106 manages the transmission timing adjustment information that corresponds to the uplink transmission timing in each of the multiple cells (the cell group or the TA group). Included in the resource request configuration information are at least maximum transmission counter configuration information and radio resource request prohibition timer information. The radio resource control unit 110 may configure multiple pieces of resource request configuration information that correspond to multiple cells, respectively, in the transmission data control unit 106.

The transmission data (which is also referred to as the uplink data, the uplink control data, and an uplink transport block) that are originated in the terminal apparatus 1 are input from the radio resource control unit 110 into the transmission data control unit 106 at an arbitrary timing. At this time, the transmission data control unit 106 calculates an amount of the transmission data (an amount of uplink buffer) that is input. Furthermore, the transmission data control unit 106 has a function of determining whether the transmission data that is input is data that belongs to the Control-plane or is data that belongs to the User-plane. Furthermore, the transmission data control unit 106 has a function of determining whether the transmission data that is input is data (first transmission data) for the base station apparatus 2 or data (second transmission data) for device-to-device communication.

Furthermore, when the transmission data is input, the transmission data control unit 106 stores the transmission data in an uplink buffer (not illustrated) within the transmission data control unit 106. Furthermore, based on a priority level of the transmission data that is stored in the uplink buffer, the transmission data control unit 106 generates the MAC PDU that does not perform multiplexing and assembling. Then, the transmission data control unit 106 determines whether or not the radio resource indispensable for the transmission of the transmission data that is input is allocated to the terminal apparatus 1. The transmission data control unit 106 selects any one of the radio resource request that uses the Physical Uplink Shared Channel (PUSCH) and the Physical Uplink Control Channel (SR-PUCCH) and the radio resource request that uses the Physical Random Access Channel, based on radio resource allocation, and makes a request to the physical layer control unit 105 for control processing for transmitting the selected channel.

Furthermore, based on whether the transmission data that is input is transmission data for the base station apparatus 2, or transmission data for the device-to-device data communication, the transmission data control unit 106 generates the Buffer Status Report. Furthermore, in accordance with the transmission control information, the coding unit 107 suitably codes each piece of data and inputs a result of the coding into the modulation unit 108.

Based on a channel structure in which each piece of coded data is transmitted, the modulation unit 108 performs suitable modulation processing. Along with mapping each piece of data being modification-processed to the frequency domain, the transmission unit 109 converts a signal in the frequency domain into a signal in the time domain, impresses the resulting signal on a carrier wave in a fixed frequency, and performs power amplification. In accordance with the transmission timing adjustment information for every cell (every cell group or every TA group), which is input from the radio resource control unit 110, the transmission unit 109 further adjusts the uplink transmission timing. It is possible that the Physical Uplink Shared Channel to which the uplink control data is mapped also include, for example, the layer 3 message (a radio resource control message (RRC message)) in addition to the user data.

Other constituent elements of the terminal apparatus 1 and a transfer path for data (the control information) between the constituent elements are omitted in FIG. 1, but it is apparent that multiple blocks that have other functions indispensable for the terminal apparatus 1 to operate are retained as constituent elements. For example, a NAS layer unit that, along with a core network, executes control, or an application layer unit is present above the radio resource control unit 110.

Figure 2:
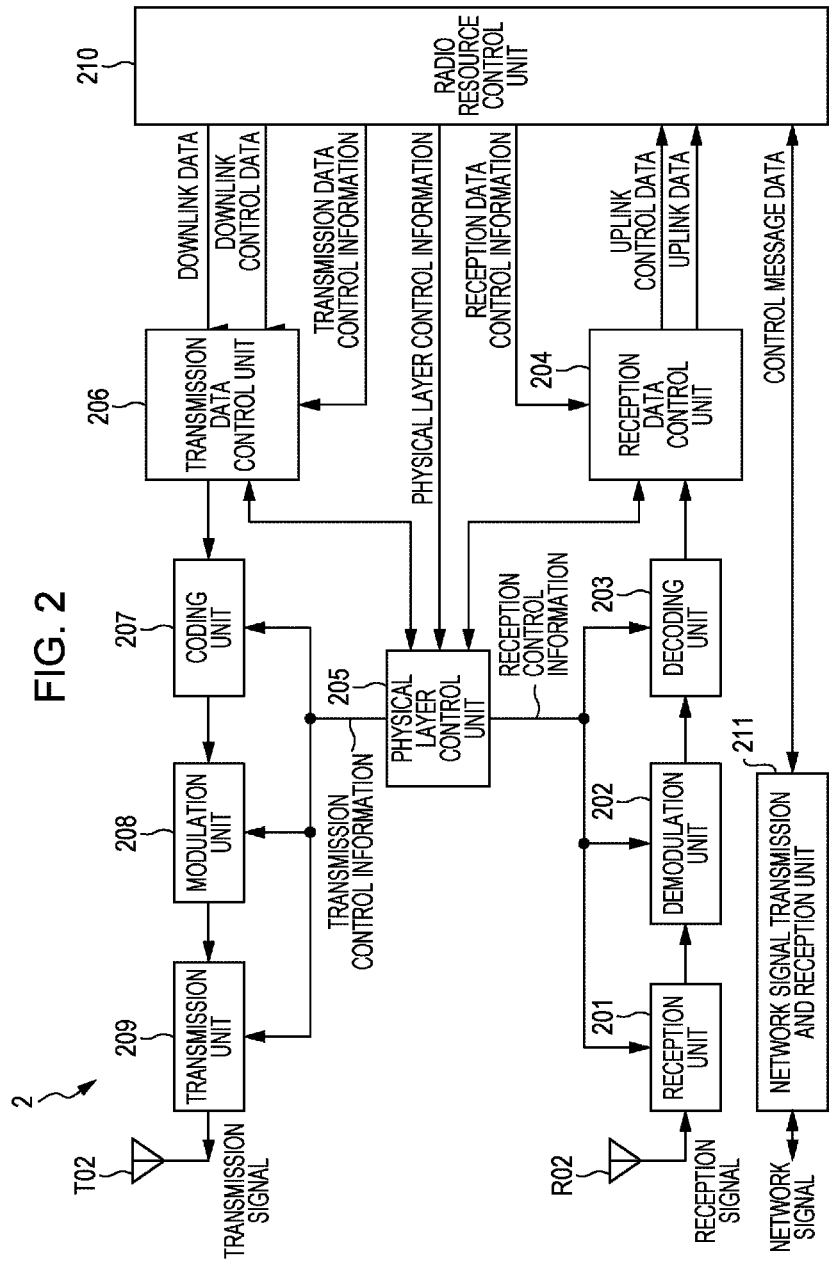
FIG. 2 is a block diagram illustrating one example of a schematic constitution of a base station apparatus according to the embodiment of the present invention.

FIG. 2 is a block diagram illustrating one example of the base station apparatus 2 according to the first embodiment of the present invention. The present base station apparatus is constituted at least from a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission and reception unit 211. The "units" in the drawings are elements that are also expressed using the terms circuit, constituent element, device, unit, and the like and that perform a function of the base station apparatus 2 and execute each procedure.

The radio resource control unit 210 is a block that performs each function of the Radio Resource Control (RRC) layer that executes the Radio Resource Control of the base station apparatus 2. Furthermore, the reception data control unit 204 and the transmission data control unit 206 are blocks that perform each function in the Medium Access Control (MAC) layer that manages the data link layer, the Radio Link Control (RLC) layer, and the Packet Data Convergence Protocol (PDCP) layer. Moreover, the base station apparatus 2 may be constituted to include some or all of blocks (the reception unit 201, the demodulation unit 202, and the decoding unit 203) in a reception system, and multiple frequencies (frequency bands and frequency bandwidths) and blocks (the coding unit 207, the modulation unit 208, and the transmission unit 209) in a transmission system, in order that, by using the carrier aggregation and the like, the transmission and reception processing at multiple frequencies (frequency bands and frequency bandwidths) or within the same subframe of a cell is supported.

The radio resource control unit 210 inputs the downlink data and the downlink control data into the transmission data control unit 206. In a case where the MAC control element that is to be transmitted to the terminal apparatus 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, the signal that is modulated in the modulation unit 208 is input into the transmission unit 209. After mapping each piece of data being input to the frequency domain, the transmission unit 209 converts a signal in the frequency domain into a signal in the time domain, impresses the resulting signal on a carrier wave in the fixed frequency, performs the power amplification, and performs the transmission. The Physical Downlink Shared Channel to which the downlink control data is mapped typically constitutes the layer 3 message (the RRC message).

Furthermore, the reception unit 201 converts the signal that is received from the terminal apparatus 1 into a digital signal in a baseband. In a case where cells at multiple different transmission timings are configured for the terminal apparatus 1, the reception unit 201 receives the signal at different timings for every cell (every cell group or every TA group). The digital signal that results from the conversion in the reception unit 201 is input into the demodulation unit 202 and is demodulated. The signal that results from the demodulation in the demodulation unit 202 is subsequently input into the decoding unit 203. The decoding unit 203 decodes the signal that is input, and inputs each piece of data (the uplink data and the uplink control data) that results from the decoding, into the reception data control unit 204. Furthermore, along with each piece of data, the MAC control element that is transmitted from the terminal apparatus 1 is decoded in the decoding unit 203 as well, and related data is input into the reception data control unit 204.

The reception data control unit 204 performs control (for example, control relating to a power headroom report, control relating to the Buffer Status Report, or the like) of the physical layer control unit 205, which is based on the received MAC control element, performs buffering of each piece of data that results from the decoding, and performs the error correction control (HARQ) of data that is retransmitted. Each piece of data that is input into the reception data control unit 204 is input into (transferred to) the radio resource control unit 210.

Furthermore, in a case where the Buffer Status Report from the terminal apparatus 1 is input from the decoding unit 203, the reception data control unit 204 determines whether the transmission resource request is a transmission resource request for communication with the base station apparatus itself or a transmission resource request for the device-to-device data communication, and configures a transmission resource that is to be allocated to the terminal apparatus 1.

The physical layer control information that is indispensable for these type of control of each block is information that is constituted from reception control information and transmission control information and that includes a parameter configuration indispensable for wireless communication control by the base station apparatus 2. The physical layer control information is configured by the higher-level network apparatus (an MME, a gateway apparatus (SGW), an OAM, or the like) or the system parameter, and, if need arises, is input by the radio resource control unit 210 into the control unit 204.

The physical layer control unit 205 inputs the physical layer control information associated with the transmission, as the transmission control information, into each block, that is, the coding unit 207, the modulation unit 208, and the transmission unit 209, and suitably inputs the physical layer control information associated with the reception, as the reception control information, into each block, that is, the reception unit 201, the demodulation unit 202, and the decoding unit 203.

The control information relating to the uplink, of the terminal apparatus 1 for each of the MAC layer, the RLC layer, and the PDCP layer of the base station apparatus 2 is included in the reception data control information. Furthermore, the control information relating to the downlink, of the terminal apparatus 1 for each of the MAC layer, the RLC layer, and the PDCP layer of the base station apparatus 2 is included in the transmission data control information. That is, the reception data control information and transmission data control information are configured for every terminal apparatus 1.

The network signal transmission and reception unit 211 performs the transmission (transfer) or reception of a control message between the base station apparatuses 2 or between the higher-level network apparatus (the MME or the SGW) and the base station apparatus 2, or of the user data. Other constituent elements of the base station apparatus 2 and the transfer path for data (the control information) between the constituent elements are omitted in FIG. 2, but it is apparent that multiple blocks that have other functions indispensable for the base station apparatus 2 to operate are retained as constituent elements. For example, a Radio Resource Management unit or an application layer unit is present over the radio resource control unit 210.

Figure 3:
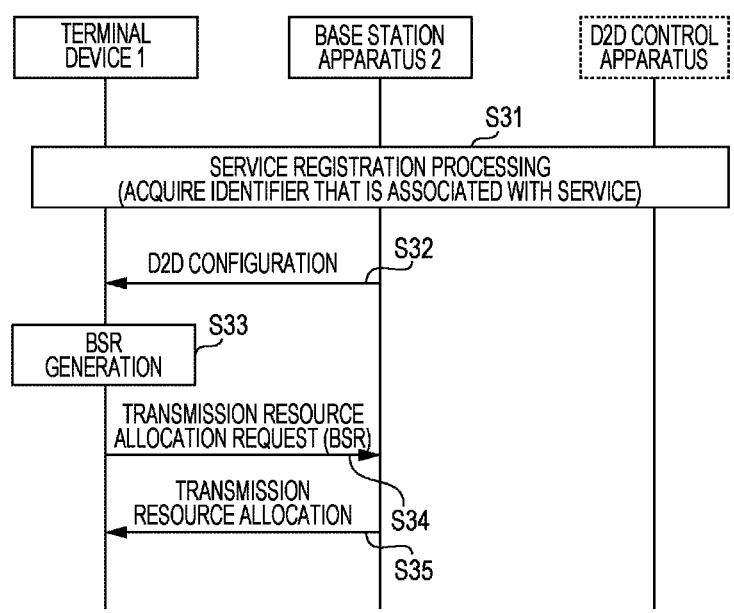
FIG. 3 is a sequence chart illustrating one example relating to a transmission resource request for device-to-device data communication according to the embodiment of the present invention.

Next, one example of a procedure in which the terminal apparatus 1 makes a request to the base station apparatus 2 for the transmission resource for the device-to-device data communication from the base station apparatus 2 is described referring to FIG. 3.

Moreover, according to the present embodiment, a D2D control apparatus is described as one apparatus, but no limitation to this is imposed. A function of the D2D control apparatus may be mounted into various apparatuses (for example, the base station apparatus, the MME, the gateway apparatus, or the like) on the network, and multiple functions of the D2D control apparatus may be built into different apparatuses, respectively. Furthermore, the function of the D2D control apparatus may be built into different apparatuses for every service or application for the device-to-device communication.

In FIG. 3, the terminal apparatus 1 that performs the device-to-device data communication requests the D2D control apparatus to register to a service of performing the device-to-device data communication, and acquires information indispensable for the device-to-device data communication from the D2D control apparatus (Step S31). The pieces of information, for example, include an identifier that is associated with a single service or application, an identifier that is associated with a group of multiple services or applications, an identifiers for identifying multiple groups that result from dividing the single service or application, and the like. Furthermore, the pieces of information, for example, may include information, that is, an identifier for identifying a transmission source and/or a destination of the device-to-device data communication. Furthermore, the pieces of information, for example, may include information, that is, an identifier indicating a service area in which the device-to-device data communication is performed or a frequency at which the data communication is performed. Alternatively, when it comes to the terminal apparatus 1, the information may be dynamically configured to be within the terminal apparatus 1 itself, and in a case where the information is once acquired, the terminal apparatus 1 may start the time check of the timer that counts a fixed time, and may acquire the information again when the timer expires.

Furthermore, the terminal apparatus 1 that performs the device-to-device data communication acquires a D2D configuration from the base station apparatus 2 (Step S32), and, based on configuration of a D2D reception resource that is included in the D2D configuration, receives the Scheduling assignment that is transmitted from the terminal apparatus 1 that performs a different transmission operation. Furthermore, in the D2D configuration, information relating to the Logical Channel (LC) that is used for the device-to-device data communication, or information of the Logical Channel Group (LCG) may be included, and information of the Logical Channel Group that is used for the BSR at the time of the transmission resource request may be included. Moreover, the D2D configuration may be notified (or broadcast) as a single message, and may be notified (or broadcast) as multiple massagers.

The terminal apparatus 1 generates the Buffer Status Report if need arises, in the data communication between the terminal apparatus 1 itself and the base station apparatus 2 and in the device-to-device data communication (Step S33).

One example of the generation of the Buffer Status Report in Step S33 will be described below.

(1) In a case where the periodic BSR-Timer is configured for the terminal apparatus 1, when the time check of the periodic BSR-Timer expires, the periodic BS is triggered. At this point, for the periodic BSR-Timer, a timer that is applied to the BSR for the transmission data to the base station apparatus 2, and a timer that is applied to the BSR for the transmission data to the device-to-device data communication may be configured in a shared manner, be configured independently, and be applied only to either of the BSRs.

For example, the periodic BSR-Timer that is shared may be configured for the terminal apparatus 1, and the BSR for the transmission data for the base station apparatus 2 and the BSR for the transmission data for the device-to-device data communication may be included in the periodic BSR. Accordingly, there is no need for the terminal apparatus 1 to manage multiple timers.

Alternatively, for the terminal apparatus 1, the periodic BSR-Timer that is shared may be configured, and 2-bit information indicating which one of the BSR for the transmission data to the base station apparatus 2 and the BSR for the transmission data for the device-to-device data communication is included in the periodic BSR may be included. Alternatively, one-bit information indicating whether the BSR for the transmission data for the device-to-device data communication is included in the periodic BSR may be configured. Accordingly, the transmission of the unnecessary BSR can be precluded.

Alternatively, two independent periodic BSR-Timers may be configured for the terminal apparatus 1, and the BSR for the transmission data for the base station apparatus 2 and the BSR for the transmission data for the device-to-device data communication may be transmitted independently as the periodic BSR. Accordingly, the Buffer Status Report is possible with a periodicity suitable for each communication.

(2) Furthermore, when an uplink data that belongs to a certain logical channel is in a state of being able to be transmitted with the higher layer (the RLC or the PDCP), in the case where the uplink data has a higher priority level than a logical channel to which transmission data in a different state of being able to be transmitted belongs, or in the case where data in the state of being able to be transmitted is not present in any one of the logical channels, the regular BSR is triggered. Furthermore, when the time check of retxBSR-Timer expires, even in a case where the terminal apparatus 1 has data that is in the state of being able to be transmitted on any one of the logical channels, the regular BSR is triggered. At this point, for retxBSR-Timer, the timer that is applied to the BSR for the transmission data to the base station apparatus 2, and the timer that is applied to the BSR for the transmission data to the device-to-device data communication may be configured in a shared manner, be configured independently, and may be applied only to either of the BSRs.

For example, retxBSR-Timer that is shared may be configured for the terminal apparatus 1, and the BSR for the transmission data for the base station apparatus 2 and the BSR for the transmission data for the device-to-device data communication may be included in the regular BSR. Accordingly, there is no need for the terminal apparatus 1 to manage multiple timers.

Alternatively, retxBSR-Timer that is shared may be configured for the terminal apparatus 1, and at least any one of the BSR for the transmission data for the base station apparatus 2 and the BSR for the transmission data for the device-to-device data communication may be included in the regular BSR. Accordingly, the transmission of the unnecessary BSR (for example, in a case where the transmission data is not present) can be precluded.

Alternatively, two independent retxBSR-Timers may be configured for the terminal apparatus 1, and the BSR for the transmission data for the base station apparatus 2 and the BSR for the transmission data for the device-to-device data communication may be transmitted independently as the regular BSR. Accordingly, the Buffer Status Report is possible with a periodicity suitable for each communication.

Figure 4:
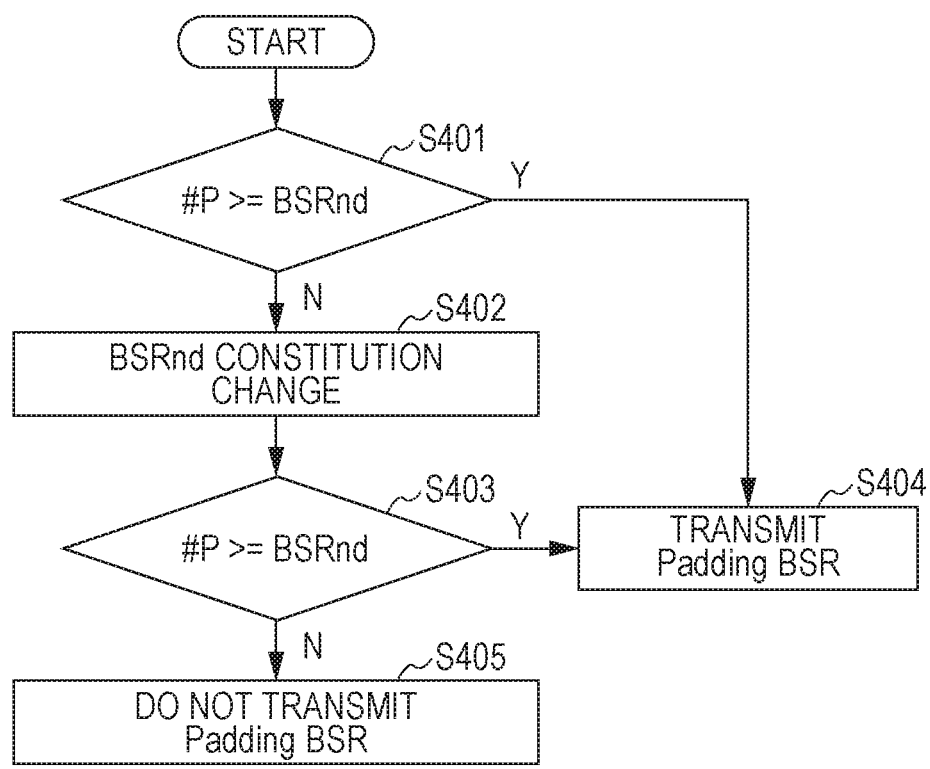
FIG. 4 is a flowchart illustrating one example of a procedure relating to padding BSR generation by a terminal apparatus according to a first embodiment of the present invention.

(3) Furthermore, the uplink resource is allocated to the terminal apparatus itself, and in a case where the allocated uplink resource has as large a padding region as is necessary for some portions or all portions of the BSR, the padding BSR is triggered. At this point, the terminal apparatus 1 performs processing that is illustrated in FIG. 4, based on the number of bits indispensable for the transmission of the BSR for the transmission data to the base station apparatus 2 and of the BSR for the transmission data for the device-to-device data communication, and on the number of bits of the padding region.

First, based on the LCG that has to be reported, the terminal apparatus 1 selects the Short BSR or the Long BSR as the Buffer Status Report (BSRn) for the data communication between the terminal apparatus 1 itself and the base station apparatus 2. Furthermore, based on the LCG that has to be reported, the Short BSR or the Long BSR is selected as the Buffer Status Report (BSRd) for the device-to-device data communication.

Next, the number (BSRnd) of bits that includes BSRn and BSRd, and a subheader of each of BSRn and BSRd (subheaders of both), and the number (#P) of bits of the padding region are compared with each other (Step S401). In a case where the number of bits of the padding region is equal to or greater than the number (BSRnd) of bits that includes BSRn and BSRd, and the subheader thereof, BSRn and BSRd are generated as the padding BSR (Step S404).

In Step S401, in a case where the number of bits of the padding region is smaller than the number of bits that includes BSRn and BSRd, and the subheader thereof, a constitution of any one of BSRN and BSRd, or constitutions of both are changed (Step S402). Next, the number of bits that includes BSRn and BSRd of which the constitutions are changed, and a subheader of each of BSRn and BSRd (subheaders of both), and the number of bits (#P) of the padding region are compared with each other (Step S403). In the case where the number of bits of the padding region is equal to or greater than the number of bits that includes BSRn and BSRd, and the subheader thereof, BSRn and BSRd are generated as the padding BSR (Step S404).

In Step S403, in a case where the number of bits of the padding region is smaller than the number (BSRnd) of bits that includes BSRn and BSRd of which the constitutions are changed, and the subheader of each of BSRn and BSRd (the subheaders of both), the padding BSR is not generated (Step S405).

At this point, an operation in Step S402 will be described in detail below.

First, in a case where both of BSRd and BSRn in Step S401 are Short BSRs, in Step S402, a constitution of the Buffer Status Report is changed in such a manner that any one of BSRn and BSRd is reported. For example, in a case where a transmission buffer status of the transmission data for the device-to-device data communication (or an application for the device-to-device data communication) that is configured to have a higher priority level than communication with the base station apparatus 2 is included in BSRd, a constitution may be employed in such a manner that only BSRd is reported. That is, in a case where the transmission buffer status of the transmission data for the device-to-device data communication (or the application for the device-to-device data communication) that is configured to have a higher priority level than the communication with the base station apparatus 2 is not included in BSRnd, a constitution may be employed in such a manner that only BSRn is reported. For the configuration of the priority level, for example, information on whether or not the device-to-device data communication takes precedence may be notified by the base station apparatus 2, a fixed priority level may be configured for the terminal apparatus 1, and the configuration of the priority level may be included in the configuration of the logical channel and/or the logical channel Group that is used for the device-to-device data communication. Moreover, in a case where any transmission buffer is 0 bytes long, the constitution of the Buffer Status Report may be changed in such a manner that only the other Buffer Status Report is reported. Furthermore, the constitution of the Buffer Status Report may be changed in such a manner that only the Buffer Status Report that has a large amount of data in the transmission buffer is reported. Moreover, the Buffer Status Report (BSRn) for the data communication with the base station apparatus 2 may take precedence at all times.

Next, in a case where any one of BSRd and BSRn is the Long BSR, the Long BSR may be changed to the Truncated BSR. Because the Truncated BSR and the Short BSR are the same in the number of bits, processing in a case where both of the above-described BSRd and BSRn are the Short BSR can be applied. Furthermore, the constitution of the Buffer Status Report may be changed in such a manner that any Buffer Status Report that has a high priority level is reported. For example, in a case where the number of bits of the padding region is equal to or greater than the number of bits that includes the Long BSR and a subheader thereof, which one of the Short BSR and Long BSR has a high priority level may be reported. Furthermore, in a case where the number of bits of the padding region is smaller than the number of bits that includes the Long BSR and the subheader thereof and is greater than the number of bits that include the Short BSR and the subheader thereof, which one of the Short BSR and the Truncated BSR has a high priority level may be reported. Moreover, the Buffer Status Report (BSRn) for the data communication with the base station apparatus 2 may take precedence at all times.

Next, in a case where both of BSRd and BSRn are the Long BSR, for any one or both, the Long BSR may be changed to the Truncated BSR. Because the Truncated BSR and the Short BSR are the same in the number of bits, processing in a case where any one of the above-described BSRd and BSRn is the Long BSR can be applied. In this case, any Long BSR that has a low priority level may be changed to the Truncated BSR. In addition, in a case where the number of bits of the padding region is not sufficiently great, by changing both of the Long BSRs to the Truncated BSR, processing in a case where both of BSRd and BSRn is the Short BSR can be applied. Furthermore, the constitution of the Buffer Status Report may be changed in such a manner that any Buffer Status Report that has a high priority level is reported. For example, in a case where the number of bits of the padding region is equal to or greater than the number of bits that includes the Long BSR and the subheader thereof, which is the Long BSR that has a high priority level may be reported. Furthermore, in the case where the number of bits of the padding region is smaller than the number of bits that includes the Long BSR and the subheader thereof and is greater than the number of bits that include the Short BSR and the subheader thereof, which is the Truncated BSR that has a high priority level may be reported. Moreover, the Buffer Status Report (BSRn) for the data communication with the base station apparatus 2 may take precedence at all times.

By performing constitution change of the Buffer Status Report that is based on the number of bits of the padding region and the priority level as are described above, it is possible that a transmission resource request is efficiently made to the base station apparatus 2.

Moreover, as an example, the Buffer Status Report for the device-to-device data communication and the Buffer Status Report for the data communication with the base station apparatus 2 are described as using the same format (the Short BSR and the Long BSR) is described above. However, a different format for the number of bits may be newly used as the Buffer Status Report for the device-to-device data communication, and, even in this case, the above-described operation is not influenced. Furthermore, different logical channel identifiers or the same logical channel identifiers may be allocated to the Buffer Status Report for the device-to-device data communication and the Buffer Status Report for the data communication for the base station apparatus 2, respectively.

In a case where the same logical channel identifiers are allocated, when logical channel identifiers of two Buffer Status Reports are included in one MAC PDU, the first Buffer Status Report may be interpreted as being the Buffer Status Report for the data communication with the base station apparatus 2, and the second Buffer Status Report may be interpreted as being the Buffer Status Report for the device-to-device data communication.

With the above-described processing operations in (1), (2), and (3), the terminal apparatus 1 generates the Buffer Status Report.

Moreover, in a case where the regular BSR and the periodic BSR are triggered, for example, the BSR for the transmission data to the base station apparatus 2 and the BSR for the transmission data for the device-to-device data communication may be triggered as the regular BSR. Thereafter, in a case where the BSR for the transmission data to the base station apparatus 2 is triggered as the periodic BSR, the BSR for the transmission data to the base station apparatus 2, which is included in the periodic BSR, and the BSR for the transmission data for the device-to-device data communication, which is included in the regular BSR, may be included in the MAC PDU that is transmitted.

Returning back to the description that is provided referring to FIG. 3, the terminal apparatus 1 transmits to the Buffer Status Report that is generated in Step S33, to the base station apparatus 2 (Step S34). At this time, in a case where the regular BSR is triggered, and the uplink resource is not allocated to the terminal apparatus itself, the Scheduling Request is triggered. Based on the maximum number of retransmission (dsr-TransMax) and a timer (sr-Prohibit-Timer) that prohibits retransmission for a fixed period of time, the terminal apparatus 1 provide instruction in a such a manner that the Scheduling Request is transmitted from the MAC layer to PHY layer.

At this point, the time check of sr-ProhibitTimer may be performed independently with the Scheduling Request for the transmission data for the base station apparatus 2 and the Scheduling Request for the transmission data for the device-to-device data communication. That is, the Scheduling Request for the transmission data for the device-to-device data communication may be sent during a period (while the time check of sr-ProhibitTimer is in progress) during which to prohibit the retransmission of the Scheduling Request for the transmission data to the base station apparatus 2.

The base station apparatus 2 that receives the Buffer Status Report in Step S34 determines the transmission resource that is to be allocated to the terminal apparatus 1, based on the notified transmission buffer status of the terminal apparatus 1, and notifies the terminal apparatus 1 of the determined transmission resource (Step S35).

With this constitution, the terminal apparatus 1 can position the Buffer Status Report for the transmission data to the base station apparatus 2 and the transmission data for the device-to-device data communication, in such a manner that the Buffer Status Report is identified within one MAC PDU. Furthermore, based on the number of bits of the padding region of the uplink resource that is allocated to the terminal apparatus itself and on the priority level of the transmission data, the terminal apparatus 1 can change the constitution of the Buffer Status Report to be generated.

According to the first embodiment, the terminal apparatus 1 positions the Buffer Status Report for the transmission data to the base station apparatus 2 and the transmission data for the device-to-device data communication in such a manner that the Buffer Status Report is identified within one MAC PDU. Furthermore, based on the number of bits of the padding region of the uplink resource that is allocated to the terminal apparatus itself and on the priority level of the transmission data, the terminal apparatus 1 changes the constitution of the Buffer Status Report to be generated. Thus, the Buffer Status Report for the transmission data to the base station apparatus 2 and the Buffer Status Report for the transmission data for the device-to-device data communication can be efficiently notified to the base station apparatus 2.

Second Embodiment

A second embodiment of the present invention will be described below.

According to the first embodiment, the operation relating to the generation of the Buffer Status Report in the transmission resource request is described above. According to the present embodiment, one example of an operation, in which the padding BSR in Step S33 is generated in a case where the Buffer Status Report that is used for the transmission data for the device-to-device data communication uses a format of the Short BSR at all times, is described.

The terminal apparatus 1 and the base station apparatus 2 that are used in the present embodiment are the same as those in the first embodiment, and thus detailed descriptions thereof are omitted.

Furthermore, a procedure in which the terminal apparatus 1 makes the request to the base station apparatus 2 for the transmission resource for the device-to-device data communication is also the same as that in the first embodiment, which is described referring to FIG. 3, and thus a detailed description thereof is omitted.

Figure 5:
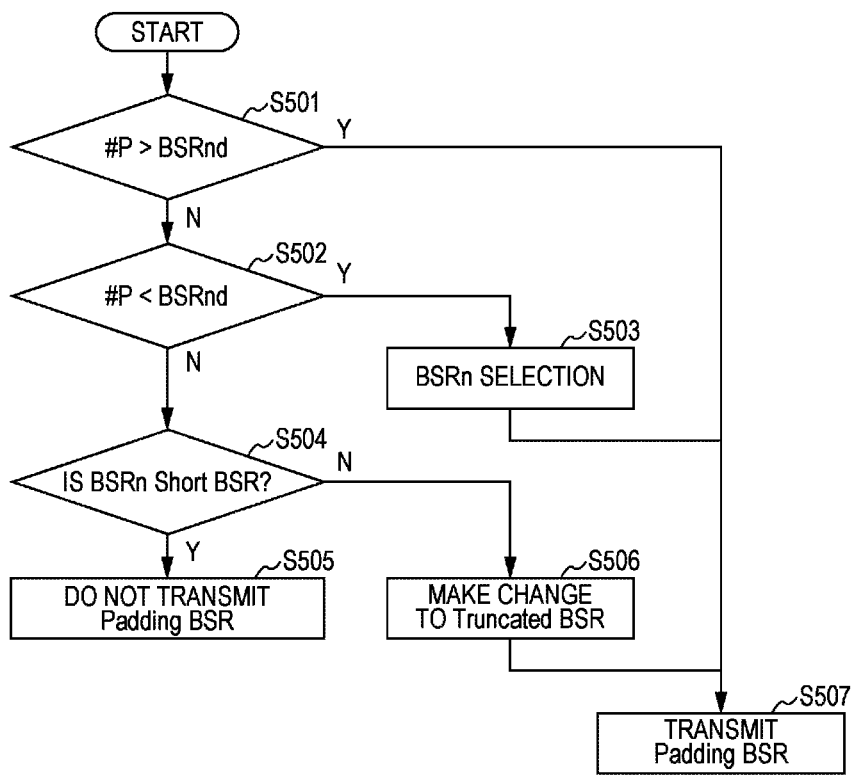
FIG. 5 is a flowchart illustrating one example of a procedure relating to padding BSR generation by a terminal apparatus according to a second embodiment of the present invention.

In Step S33 in FIG. 3, the uplink resource is allocated to the terminal apparatus itself, and in the case where the allocated uplink resource has as large the padding region as is necessary for some portions or all portions of the BSR, the padding BSR is triggered. At this point, the terminal apparatus 1 performs processing that is illustrated in FIG. 5, based on the number of bits indispensable for the transmission of the BSR for the transmission data to the base station apparatus 2 and of the BSR for the transmission data for the device-to-device data communication, and on the number of bits of the padding region.

First, based on the LCG that has to be reported, the terminal apparatus 1 selects the Short BSR or the Long BSR as the Buffer Status Report (BSRn) for the data communication between the terminal apparatus 1 itself and the base station apparatus 2. Furthermore, the Short BSR (or BSR for the device-to-device data communication that has the same format as the Short BSR) is selected as the Buffer Status Report (BSRd) for the device-to-device data communication.

Next, the number of bits (BSRnd) that includes BSRn and BSRd, and the subheader of each of BSRn and BSRd (subheaders of both), and the number of bits (#P) of the padding region are compared with each other (Step S501). In a case where the number of bits of the padding region is equal to or greater than the number (BSRnd) of bits that includes BSRn and BSRd, and the subheader thereof, BSRn and BSRd are generated as the padding BSR (Step S507).

In Step S501, in a case where the number of bits of the padding region is smaller than the number of bits that includes BSRn and BSRd, and the subheader thereof, the number of bits of the padding region and the number of bits that includes BSRn and the subheader thereof are compared with each other (Step S502). In a case where the number of bits of the padding region is equal to or greater than the number of bits that includes BSRn and the subheader thereof, BSRn is selected as the padding BSR (Step S503), and the padding BSR is generated (Step S507).

In Step S502, in a case where the number of bits of the padding region is smaller than the number of bits that includes BSRn and the subheader thereof, it is determined whether or not BSRn is the Short BSR (Step S504). In a case where the BSRn is the Short BSR, the Padding BSR is not transmitted (Step S505). Furthermore, in a case where the BSRn is not the Short BSR, BSRn is changed to the Truncated BSR (Step S506), and the padding BSR is generated (Step S507).

With this constitution, when generating the padding BSR for both of the transmission data to the base station apparatus 2 and the transmission data for the device-to-device data communication, the terminal apparatus 1 can generate the simpler Buffer Status Report by using the format of the Short BSR at all times for the Buffer Status Report for the transmission data for the device-to-device data communication.

According to the second embodiment, when generating the padding BSR for both of the transmission data to the base station apparatus 2 and the transmission data for the device-to-device data communication, the terminal apparatus 1 can efficiently notify the base station apparatus 2 of the BSR for the transmission data to the base station apparatus 2 and the BSR for the transmission data for the device-to-device data communication, with simple processing, by performing the processing using the format of the Short BSR at all times for the Buffer Status Report for the transmission data for the device-to-device data communication.

According to each embodiment described above, the example is described in which the terminal apparatus 1 acquires the transmission resource from the base station apparatus 2. However, in a case where the base station apparatus 2 notifies the terminal apparatus 1 of a resource (a schedule-type resource) for which a dedicated transmission resource request is indispensable and a resource (autonomous-type resource) for which a dedicated transmission resource request is not indispensable, as a resource for the device-to-device data communication, using the broadcast information or the notification information, in such a manner that the terminal apparatus 1 can identify the scheduled-type resource and the autonomous-type resource, the terminal apparatus 1 may determine whether or not the Buffer Status Report for the device-to-device data communication is generated, based on the broadcast information or the notification information. Accordingly, unnecessary signaling can be precluded.

Furthermore, according to each embodiment described above, in the case where the terminal apparatus 1 requests the schedule-type resource for a cell (a frequency) other than the cell (the frequency) that is controlled by the base station apparatus 2 itself, the base station apparatus 2 may cause the terminal apparatus 1 to perform the handover to the cell of the base station apparatus 2 that controls the resource for the cell (frequency). Accordingly, efficient resource allocation can be performed.

Furthermore, according to each embodiment described above, the base station apparatus 2 may notify the terminal apparatus 1 of a resource that the terminal apparatus 1 itself controls or a resource that a different device controls, as the resource for the device-to-device data communication, using the broadcast information or the notification information, using the broadcast information or the notification information, in such a manner that the terminal apparatus 1 can identify the resource that the terminal apparatus 1 itself controls and the resource that a different device controls. In this case, based on the broadcast information or the notification information, only in case where the schedule-type resource that the base station apparatus 1 which covers the serving cell controls is used, the terminal apparatus 1 may generate the Buffer Status Report for the device-to-device data communication. Accordingly, the unnecessary signaling can be precluded.

Furthermore, according to each embodiment described above, a function of the base station apparatus 2 may be built into a different apparatus. For example, a function of allocating the transmission resource for the above-described device-to-device data communication may be built into the terminal apparatus 1 that is a master device for the device-to-device data communication. In this case, only the Buffer Status Report for the device-to-device data communication may be notified to a master device.

Furthermore, according to each embodiment described above, even in a case where the extended BSR-Sizes are configured, the terminal apparatus 1 may use the normal table in order to indicate the amount of transmission buffer for the device-to-device data communication. Accordingly, in a case where an amount of communication for the device-to-device data communication when compared with the data communication with the base station apparatus 2, it is possible that the more suitable amount of transmission buffer is reported to the extent of more suitable granularity. Alternatively, the extended D2D BSR-Sizes for the device-to-device data communication may be newly configured. Accordingly, it is possible that, according to the amount of communication for the device-to-device data communication, the amount of transmission buffer is reported to the extent of more suitable granularity.

Moreover, the embodiments described above are only simple examples, and can be realized using various modification examples and substitution examples. For example, it is possible that an uplink transmission scheme is also applied to a communication system in compliance with either a frequency division duplex (FDD) scheme or a time division duplex (TDD) scheme. Furthermore, because the name of each parameter or each event that is described according to the embodiments is given for convenience of description, even if the name that is applied in practice and the name according to the embodiments of the present invention are different from each other, this does not exert any influence on the gist of the invention claimed, in the embodiments of the present invention.

Furthermore, the term "connection" that is used in each embodiment is not limited only to the configuration in which a certain device or apparatus and another certain device or apparatus are connected directly to each other using a physical circuit, and includes the meaning of a configuration in which a connection is made logically or of a configuration in which a wireless connection is made using a wireless technology.

Furthermore, the terminal apparatuses 1 include not only a portable or moving mobile station apparatus, but also an stationary-type electronic apparatus that is installed indoors or outdoors, or a non-moving-type electronic apparatus, for example, an AV apparatus, a kitchen apparatus, a cleaning and washing machine, an air-conditioning apparatus, office equipment, a vending machine, other household apparatuses or measuring apparatuses, a vehicle-mounted apparatus, and a device that results from building a communication function into a wearable device or a health care device that is capable of be worn on a human body. Furthermore, the terminal apparatus 1 is used not only for human-to-human or human-to-machine communication, but also for a machine-to-machine communication (Machine Type Communication).

The terminal apparatus 1 is also referred to as a user terminal, a mobile station apparatus, a communication terminal, a mobile machine, a terminal, a User Equipment (UE), or a Mobile Station (MS). The base station apparatus 2 is also referred to as a wireless base station apparatus, a base station, a wireless base station, a fixed station, a NodeB (NB), an evolved Node B (eNB), a Base Transceiver Station (BTS), or a Base Station (BS).

Moreover, the base station apparatus 2 is referred to as the NB in UMTS that is stipulated by 3GPP, and as the eNB in EUTRA or Advanced EUTRA. Moreover, the terminal apparatus 1 is also referred to as the UE in UMTS that is stipulated by 3GPP, EUTRA, and Advanced EUTRA.

Furthermore, for convenience of description, the method, the means, and the algorithm step of realizing the functions of, some of the functions, of the units of each of the terminal apparatus 1 and the base station apparatus 2 are described in specific combinations referring to the functional block diagrams, but these can be realized directly by software, a software module that is implemented by a processor, or combinations of these.

If the method, the means, and the algorithm step are built in hardware, in addition to being constituted as described referring to the block diagrams, the terminal apparatus 1 and the base station apparatus 2 each are constituted from a power supply device or battery that supplies power to the terminal apparatus 1 and the base station apparatus 2, a display device such as a liquid crystal display, a display drive device, a memory, an input and output interface, input and output terminals, a speaker, and other peripheral devices.

If the method, the means, and the algorithm step are built in software, the function can be retained as one or more commands or codes on a computer-readable medium, and can be transmitted. The computer-readable media include both of a communication media or a computer recording media that helps to carry a computer program from one place to another place.

Then, one or more commands or codes may be recorded on the computer-readable recording medium, a computer system be caused to read and execute the one or more command or codes that are recorded on the recording medium to perform control of the terminal apparatus 1 or the base station apparatus 2. Moreover, the "computer system" here is defined as including an OS and hardware components such as a peripheral device.

The operations that are described according to each embodiment of the present invention may be realized with a program. A program running on the terminal apparatus 1 and the base station apparatus 2 according to each embodiment of the present invention is a program (a program for causing a computer to operate) that controls a CPU and the like in such a manner as to realize the above-described functions of each embodiment according to each embodiment of the present invention. Then, pieces of information that are handled in the apparatus and the device are temporarily stored in a RAM while being processed. Thereafter, the pieces of information are stored in various ROMs or HDDs, and if need arises, is read by the CPU to be modified or written.

Furthermore, in some cases, the functions of the embodiments described above are realized by executing the program, and in addition, the functions of each embodiment of the present invention are realized by performing processing in conjunction with an operating system or other application programs, based on an instruction from the program.

Furthermore, the "computer-readable recording medium" refers to a portable medium, such as a semiconductor medium (for example, a RAM, a nonvolatile memory card, or the like), an optical recording medium (for example, a DVD, an MO, an MD, a CD, a BD, or the like), and a magnetic recording medium (for example, a magnetic tape, a flexible disk, or the like), and a recording device, such as a disk unit that is built into the computer system. Moreover, the "computer-readable recording media" is defined as including a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time.

Furthermore, the program described above may be one for realizing some of the functions described above and additionally may be one that can realize the functions described above in combination with a program that is already recorded in the computer system.

Furthermore, functional blocks or all features of each of the terminal apparatus 1 and the base station apparatus 2 according to each embodiment described above can be built into or implemented by a general-purpose processor, a digital signal processor (DSP), an application-specific integrated circuit (ASIC) or a general-purpose arbitrary integrated circuit (IC), a field programmable gate-array signal (FPGA) or other programmable logic devices, a discrete gate or a transistor logic, a discrete hardware component, or a combination of these.

The general-purpose processor may be a microprocessor, and instead, the processor may be a conventional processor, a controller, a microcontroller, or a state machine. The general-purpose processor or each circuit described above may be constituted as a digital circuit, and may be constituted as an analog circuit.

Furthermore, the processor may be built as a combination of computing devices. For example, the processor may be a DSP and a microprocessor, multiple microprocessors, one or more microprocessors that are connected to a DSP core, or a combination of other such constitutions.

The embodiments of the invention are described in detail above based on the specific examples, but it is apparent that the nature of each of the embodiments of the present invention and a scope of claims are not limited to the specific examples. A change in design and the like that fall within the scope that does not depart from the gist of the invention are also included. That is, the description in the present specification serves the purpose of providing an exemplary description, and does not impose any limitation to each embodiment of the present invention.

Furthermore, various modifications are possible within the scope of the present invention defined by claims, and embodiments that are implemented by suitably combining technical means that are disclosed according to different embodiments are also included in the technical scope of the present invention. Furthermore, a configuration in which a constituent element that achieves the same effect is substituted for the one that is described according to each embodiment described above is also included in the technical scope of the present invention.

INDUSTRIAL APPLICABILITY

The present invention can be used for a communication system and an apparatus or a device that constitutes the communication system.

DESCRIPTION OF REFERENCE NUMERALS

1 TERMINAL APPARATUS
2, 2-1, 2-2 BASE STATION APPARATUS
101, 201 RECEPTION UNIT
102, 202 DEMODULATION UNIT
103, 203 DECODING UNIT
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT
211 NETWORK SIGNAL TRANSMISSION AND RECEPTION UNIT

The invention claimed is:

1. A terminal apparatus configured and/or programmed to perform data communication with a base station apparatus, and perform inter-terminal apparatus data communication (device-to-device data communication) involving no base station apparatus, the terminal apparatus comprising:
a first transmission buffer that stores first transmission data to the base station-apparatus; and a second transmission buffer that stores second transmission data for the device-to-device data communication; and transmission data control circuitry configured and/or programmed to constitute a first buffer status report and a second buffer status report based on priority levels of the first and the second transmission data, wherein the first transmission data is prepared in the first transmission buffer of the terminal apparatus and the second transmission data is prepared in the second transmission buffer of the terminal apparatus; and wherein each of the first buffer status report and the second buffer status report includes information about the amount of transmission data; and transmission circuitry configured and/or programmed to report the first buffer status report and the second buffer status report to the base station apparatus, which are used in a padding region of an uplink resource allocated to the terminal apparatus, and wherein, when the padding region is present, the first buffer status report for the first transmission data and the second buffer status report for the second transmission data are reported in order of the priority levels, and wherein one of the first and second buffer status reports is changed to be shorter in format as determined based on the priority levels if necessary, and the first or the second buffer status report are not transmitted in a case the first or the second buffer status report to be included for the padding region can't be placed in the padding region.

2. The terminal apparatus according to claim 1, wherein the transmission circuitry reports the buffer status report using a padding region of an uplink resource allocated to the terminal apparatus, and wherein, in a case where the padding region is not able to include both a first buffer status report for the first transmission data and a second buffer status report for the second transmission data, the transmission circuitry reports to the base station apparatus the first or second buffer status report for the first or second transmission data with a higher priority level.

3. A terminal apparatus configured and/or programmed to perform data communication with a base station apparatus, and perform inter-terminal apparatus data communication (device-to-device data communication) involving no base station apparatus, the terminal apparatus comprising:

a first transmission buffer storing a first transmission data to the base station apparatus; and a second transmission buffer storing a second transmission data for the device-to-device data communication; and transmission data control circuitry configured and/or programmed to constitute a buffer status report based on the first transmission data, the second transmission data, and priority levels of the first and second transmission data, wherein the first transmission data is prepared in the first transmission buffer of the terminal apparatus and the second transmission data is prepared in the second transmission buffer of the terminal apparatus; and wherein the buffer status report includes information about the amount of transmission data; and transmission circuitry configured and/or programmed to report the buffer status report to the base station apparatus:

wherein the transmission circuitry reports the buffer status report using a padding region of an uplink resource allocated to the terminal apparatus, and wherein, in a case where the padding region is not able to include both a first buffer status report for the first transmission data and a second buffer status report for the second transmission data, the transmission data control circuitry determines based on the priority levels which of the first and second buffer status reports is changed to be shorter in format.

4. The terminal apparatus according to claim 3, wherein, in a case where the padding region is able to include both the first buffer status report and the second buffer status report, the transmission data control circuitry determines that both the first and second buffer status reports are not changed to be shorter in format.

5. A communication system comprising:

a terminal apparatus configured and/or programmed to perform inter-terminal apparatus data communication (device-to-device data communication) involving no base station apparatus; and a base station apparatus configured and/or programmed to allocate to the terminal apparatus, a transmission resource for the device-to-device data communication, a first transmission data to the base station apparatus is prepared in a first transmission buffer of the terminal apparatus and a second transmission data for the device-to-device data communication is prepared in a second transmission buffer of the terminal apparatus and wherein the first transmission data, the second transmission data, and the information are to be used for the terminal apparatus to constitute and report a first buffer status report and a second buffer status report to the base station apparatus and wherein each of a first buffer status report and a second buffer status report includes information about the amount of transmission data and wherein the first buffer status report and the second buffer status report which are used in a padding region of an uplink resource allocated to the terminal apparatus, and wherein, when the padding region is present, the first buffer status report for the first transmission data and the second buffer status report for the second transmission data are reported in order of the priority levels, and wherein one of the first and second buffer status reports is changed to be shorter in format as determined based on the priority levels if necessary, and the first or the second buffer status report are not transmitted in a case the first or the second buffer status report to be included for the padding region can't be placed in the padding region.

6. A notification method that is applied to a terminal apparatus configured and/or programmed to perform inter-terminal apparatus data communication (device-to-device data communication) involving no base station apparatus, the notification method at least comprising:

a step of constituting a first buffer status report and a second buffer status report based on priority levels of the first and second transmission data, wherein the first transmission data is prepared in a first transmission buffer of the terminal apparatus and the second transmission data are prepared in a second transmission buffer of the terminal apparatus; and wherein each of a first buffer status report and a second buffer status report includes information about the amount of transmission data; and a reporting the first buffer status report and the second buffer status report to the base station apparatus which are used in a padding region of an uplink resource allocated to the terminal apparatus, and wherein, when the padding region is present, the first buffer status report for the first transmission data and the second buffer status report for the second transmission data are reported in order of the priority levels, and wherein one of the first and second buffer status reports is changed to be shorter in format as determined based on the priority levels if necessary, and the first or the second buffer status report are not transmitted in a case the first or the second buffer status report to be included for the padding region can't be placed in the padding region.

7. An integrated circuit that is built into a terminal apparatus configured and/or programmed to perform inter-terminal apparatus data communication (device-to-device data communication) involving no base station apparatus, the integrated circuit causing the terminal apparatus to perform:

a function of constituting a first buffer status report and a second buffer status report based on priority levels of the first and second transmission data wherein the first transmission data is prepared in a first transmission buffer of the terminal apparatus and the second transmission data is prepared in a second transmission buffer of the second terminal apparatus;

wherein the buffer status report includes information about the amount of transmission data; and a function of reporting the buffer status report to the base station apparatus which are used in a padding region of an uplink resource allocated to the terminal apparatus, and wherein, when the padding region is present, the first buffer status report for the first transmission data and the second buffer status report for the second transmission data are reported in order of the priority levels, and wherein one of the first and second buffer status reports is changed to be shorter in format as determined based on the priority levels if necessary, and the first or the second buffer status report are not transmitted in a case the first or the second buffer status report to be included for the padding region can't be placed in the padding region.

* * * * *